United States Patent
Okawa et al.

(10) Patent No.: US 10,321,006 B2
(45) Date of Patent: Jun. 11, 2019

(54) DOCUMENT READING DEVICE AND IMAGE FORMING DEVICE

(71) Applicant: CANON KABUSHIKI KAISHA, Tokyo (JP)

(72) Inventors: Satoshi Okawa, Toride (JP); Seiji Shibaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/894,026

(22) Filed: Feb. 12, 2018

(65) Prior Publication Data

US 2018/0234578 A1  Aug. 16, 2018

(30) Foreign Application Priority Data

Feb. 15, 2017 (JP) .................................. 2017-026155

(51) Int. Cl.
 *H04N 1/12* (2006.01)
 *H04N 1/10* (2006.01)

(52) U.S. Cl.
 CPC ......... *H04N 1/1215* (2013.01); *H04N 1/1017* (2013.01); *H04N 1/123* (2013.01); *H04N 1/1275* (2013.01)

(58) Field of Classification Search
 CPC ............. H04N 1/0057; H04N 1/00588; H04N 1/00591; H04N 1/1215; H04N 1/33376; H04N 1/32443
 USPC .................................................. 358/412, 409
 See application file for complete search history.

(56) References Cited

U.S. PATENT DOCUMENTS

| | | | | |
|---|---|---|---|---|
| 5,173,735 A | * | 12/1992 | Kusumoto | G03G 15/0131 15/1.51 |
| 5,206,737 A | * | 4/1993 | Sugiyama | H04N 1/0057 358/296 |
| 5,267,058 A | * | 11/1993 | Sata | H04N 1/0057 358/496 |
| 5,523,848 A | * | 6/1996 | Musso | B41J 11/008 347/104 |
| 5,523,858 A | * | 6/1996 | Yamada | H04N 1/1215 271/9.01 |
| 5,552,902 A | * | 9/1996 | Kohno | H04N 1/0057 347/3 |

(Continued)

FOREIGN PATENT DOCUMENTS

JP 2006229860 A 8/2006

*Primary Examiner* — Ted W Barnes
(74) *Attorney, Agent, or Firm* — Canon U.S.A., Inc. IP Division

(57) ABSTRACT

A document reading device includes a conveyer for conveying a document sheet using a single drive source, a reader for reading an image of the document sheet being conveyed through a reading position, and a controller for stopping the conveyance by the conveyer if a read request for a first document sheet, which is being conveyed upstream of the reading position in a conveyance direction, has not received. The controller invalidates the image read from a second document sheet which is being conveyed downstream of the first document sheet if the trailing edge of the second document sheet has not passed through the reading position at a timing when the conveyance is stopped because of the read request having not been received, and validates the image read from the second document sheet if the trailing edge of the second document sheet has passed through the reading position.

12 Claims, 23 Drawing Sheets

(56) References Cited

U.S. PATENT DOCUMENTS

| | | | | |
|---|---|---|---|---|
| 5,579,129 A * | 11/1996 | Iwata | H04N 1/0057 |
| | | | 271/10.12 |
| 5,584,589 A * | 12/1996 | Adkins | B41J 11/0095 |
| | | | 400/584 |
| 5,764,372 A * | 6/1998 | Kondo | H04N 1/0057 |
| | | | 358/412 |
| 5,867,283 A * | 2/1999 | Nam | H04N 1/0461 |
| | | | 358/472 |
| 6,084,686 A * | 7/2000 | Ushida | H04N 1/32358 |
| | | | 358/1.1 |
| 6,151,478 A * | 11/2000 | Katsuta | B65H 5/34 |
| | | | 271/258.01 |
| 6,948,871 B1 * | 9/2005 | Onishi | H04N 1/02427 |
| | | | 347/218 |
| 2001/0023624 A1 * | 9/2001 | Potakowskyj | H04N 1/00567 |
| | | | 74/810.1 |
| 2003/0151778 A1 * | 8/2003 | Tsutsumi | H04N 1/0464 |
| | | | 358/474 |
| 2004/0004319 A1 * | 1/2004 | Hattori | B65H 5/34 |
| | | | 271/10.01 |
| 2005/0280204 A1 * | 12/2005 | Knierim | B65H 7/12 |
| | | | 271/262 |
| 2006/0210342 A1 * | 9/2006 | Fujikawa | B41J 3/44 |
| 2006/0215218 A1 * | 9/2006 | Ujigawa | H04N 1/00278 |
| | | | 358/1.15 |
| 2009/0039594 A1 * | 2/2009 | Sato | H04N 1/0473 |
| | | | 271/258.01 |
| 2010/0072691 A1 * | 3/2010 | Ueda | B65H 3/0607 |
| | | | 271/110 |
| 2010/0109226 A1 * | 5/2010 | Kitazawa | B65H 5/24 |
| | | | 271/3.14 |
| 2015/0222771 A1 * | 8/2015 | Mori | H04N 1/00588 |
| | | | 358/498 |
| 2015/0239694 A1 * | 8/2015 | Takeda | B65H 7/06 |
| | | | 271/258.01 |
| 2015/0244888 A1 * | 8/2015 | Sunada | H04N 1/00588 |
| | | | 358/498 |
| 2017/0371797 A1 * | 12/2017 | Oportus Valenzuela | |
| | | | G06F 12/0842 |

* cited by examiner

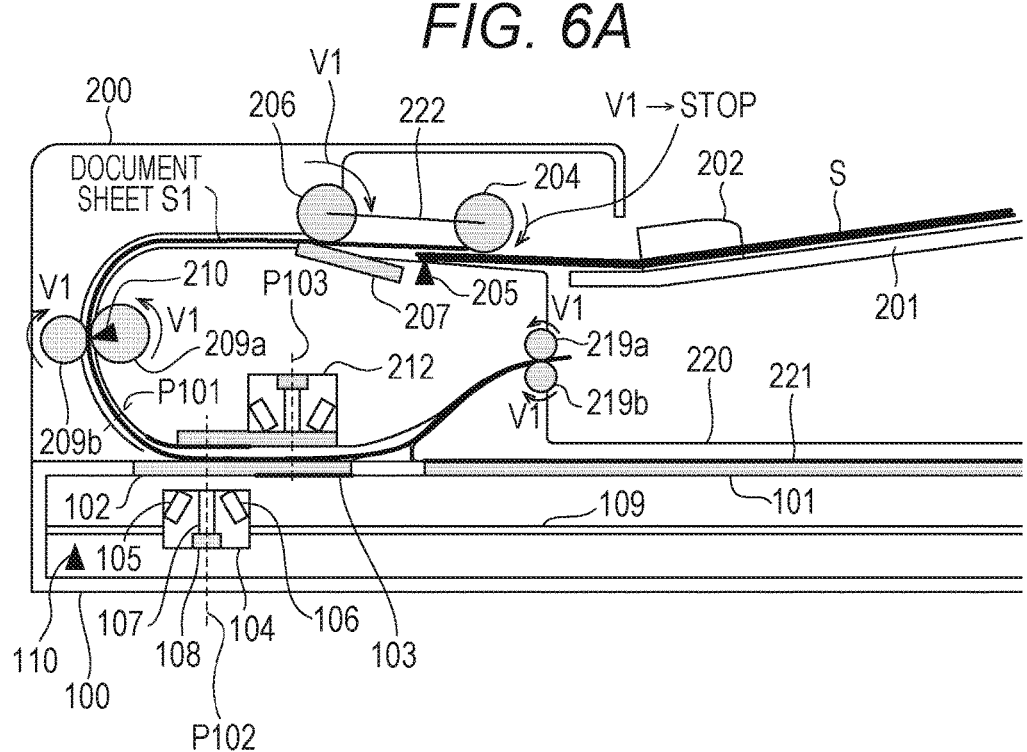
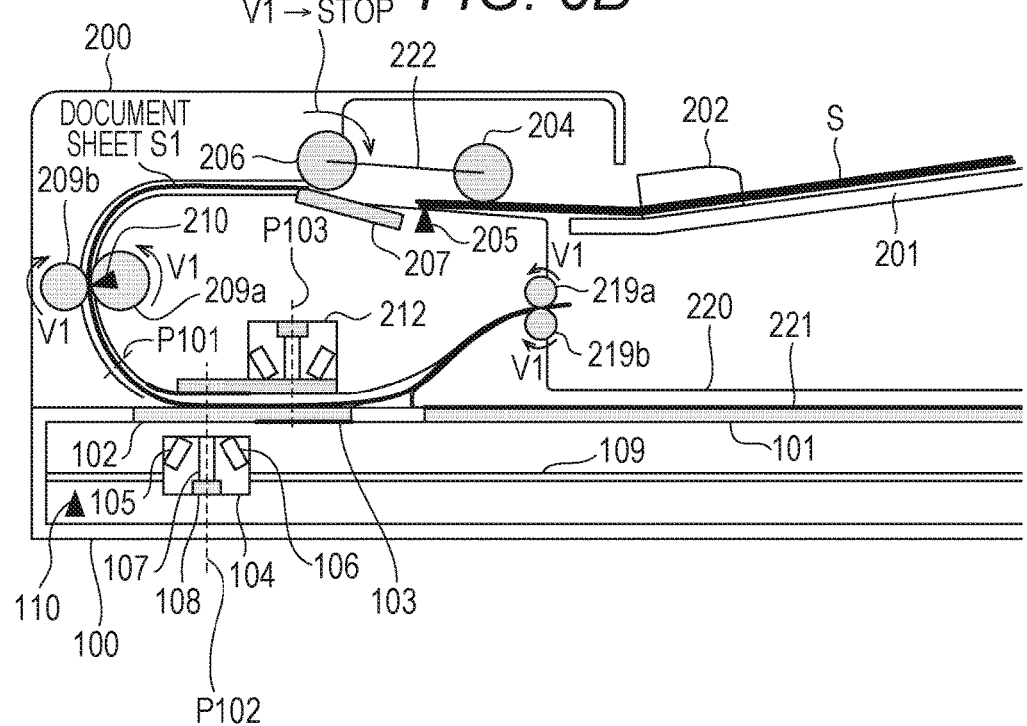

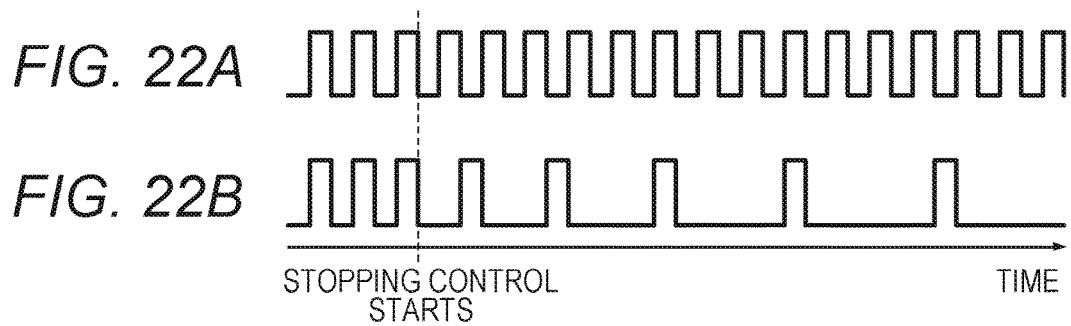
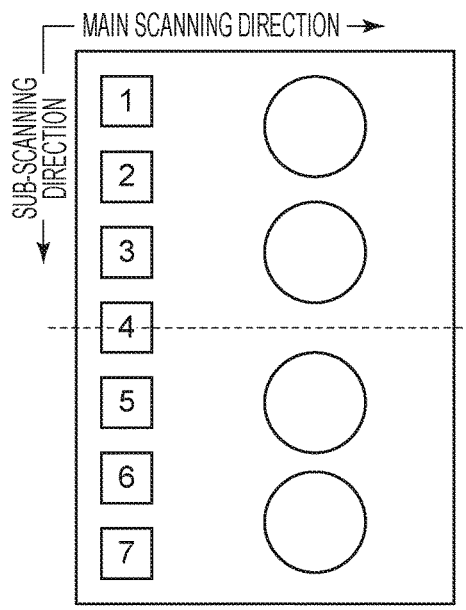
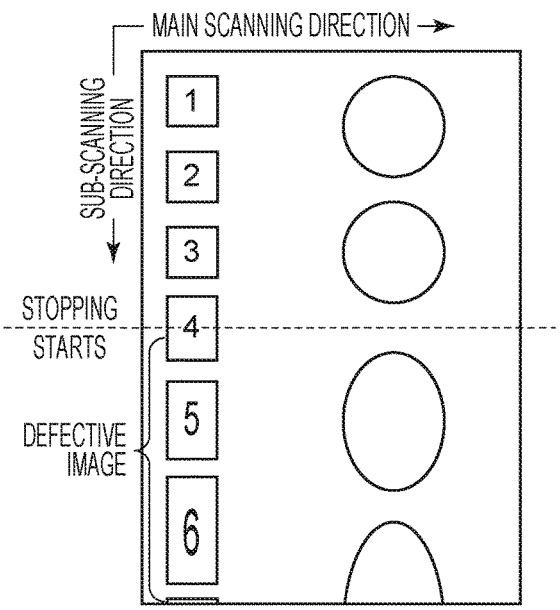

DOCUMENT READING DEVICE AND IMAGE FORMING DEVICE

BACKGROUND

Field of the Disclosure

The present disclosure relates to a document reading device including a document feeding device and to an image forming device including the document reading device.

Description of the Related Art

An automatic document feeding device (hereinafter, referred to as an ADF) provided in an image reading unit conveys a document sheet to a reading position while separating one of document sheets composing a document set at a time, and a reading unit reads each of the document sheets at the reading position. Then, the scanned document sheets are discharged to a predetermined discharge position.

In such an ADF, to further reduce the cost of the device, a drive system for the document conveyance includes a single drive motor. The ADF having this configuration is made to include a mechanical gear configuration to temporarily block transmission of a drive force to a separating roller or to make the conveyance speed of the separated document sheet to be faster than the speed at the separation. With this configuration, when the document sheets are continuously fed from the document set, an interval between a preceding document sheet and a following document sheet (a document interval distance) can be properly maintained.

For example, even when the distance between the preceding document sheet and the following document sheet is zero at the timing of being fed in a feeding unit, the preceding document sheet which has passed through the feeding unit is conveyed at a faster moving speed for reading, compared to the moving speed for feeding. Thus, even when the drive motor is kept rotating all the time, the following document sheet is kept away from the preceding document sheet by a predetermined distance at a timing when the following document comes to the reading position.

However, because of a type the document sheets, a combination of different types document sheets, operational environments (temperature, humidity, etc.) of the image reading unit, or the like, there may be a case where the following document sheet is pulled by and conveyed with the preceding document sheet when separating each document sheet from the document set. With the ADF having the configuration, when the following document sheet is pulled by and fed with the preceding document sheet, it may sometimes be difficult to properly stop the following document sheet and maintain toe distance from the preceding document sheet.

In this point of view, according to Japanese Patent Laid-Open No. 2006-229860, two sensors are provided to detect document intervals and the drive force transmitted to the document feeding roller is blocked using a clutch to maintain a necessary document interval so that the document interval is kept equal to or greater than a predetermined document interval, and a defective image such as a deficient image and the like is avoided.

However, to further reduce the cost of the ADF, it is desired to cut some parts such as a clutch, a solenoid, and the like which may increase the cost. When the respective conveying rollers are all driven by a single drive motor, it is difficult to individually block the motor drive force to each conveying roller without the parts such as a clutch, a solenoid, and the like. In other words, when the drive motor is driven, all conveying rollers are always rotated.

On the other hand, when a document image is read and there is not a space in a storage medium that stores read image data, the reading of the document sheet needs to be temporarily stopped. Specifically, since the capacity of a storage medium is small in a device made with a reduced cost, reading is often stopped temporarily. Further, since the CPU performance is also suppressed, it takes more time in an output process (e.g. printing in a printer or transmission to a device such as a personal computer) and a shortage of the capacity of the storage medium is often occurs at an input side (at the side of the reading unit).

Thus, when the document interval of the predetermined distance cannot be maintained and the reading operation is temporarily stopped because of a shortage of the space in the storage medium while the preceding document sheet is read, the conveyance of the document sheet which is being read is stopped. As a result, since the document sheet conveyance speed is reduced, a part of the image of the document becomes a defective image which is elongated in the document sheet conveyance direction (sub scanning direction).

SUMMARY OF THE DISCLOSURE

The present disclosure provides methods to prevent the image read when the document conveying is temporarily stopped from being output as a defective image even in a configuration that a plurality of conveying rollers is driven by a single motor.

According to a first aspect of the embodiments, the subject disclosure teaches a document reading device comprising a conveyer configured to convey a document sheet using a single drive source, a reader configured to read an image of the document sheet which is being conveyed through a reading position by the conveyer, and a controller configured to stop conveyance by the conveyer when a read request for a first document sheet, which is being conveyed upstream of the reading position in a document sheet conveyance direction, has not been received, wherein the controller invalidates the image read from a second document sheet which is being conveyed downstream of the first document sheet in a case where a trailing edge of the second document sheet has not passed through the reading position at a timing when the conveyance by the conveyer is stopped because of the read request having not been received, and validates the image read from the second document sheet in a case where the trailing edge of the second document sheet has passed through the reading position.

Further features of the present disclosure will become apparent from the following description of exemplary embodiments (with reference to the attached drawings).

BRIEF DESCRIPTION OF THE DRAWINGS

FIGS. 6A and 6B are explanatory views illustrating a case of conveying the plurality of document sheets, according to one or more embodiment of the subject disclosure.

FIGS. 22A and 22B are timing charts of image read timings and motor drive pulses, according to one or more embodiment of the subject disclosure.

FIGS. 23A and 23B are diagrams illustrating a condition of a defective image caused by temporarily stopping the reading of the document sheet, according to one or more embodiment of the subject disclosure.

DESCRIPTION OF THE EMBODIMENTS

First Embodiment

A document reading device according to a first embodiment of the present disclosure will be described with reference to the drawings.

Figure 1:
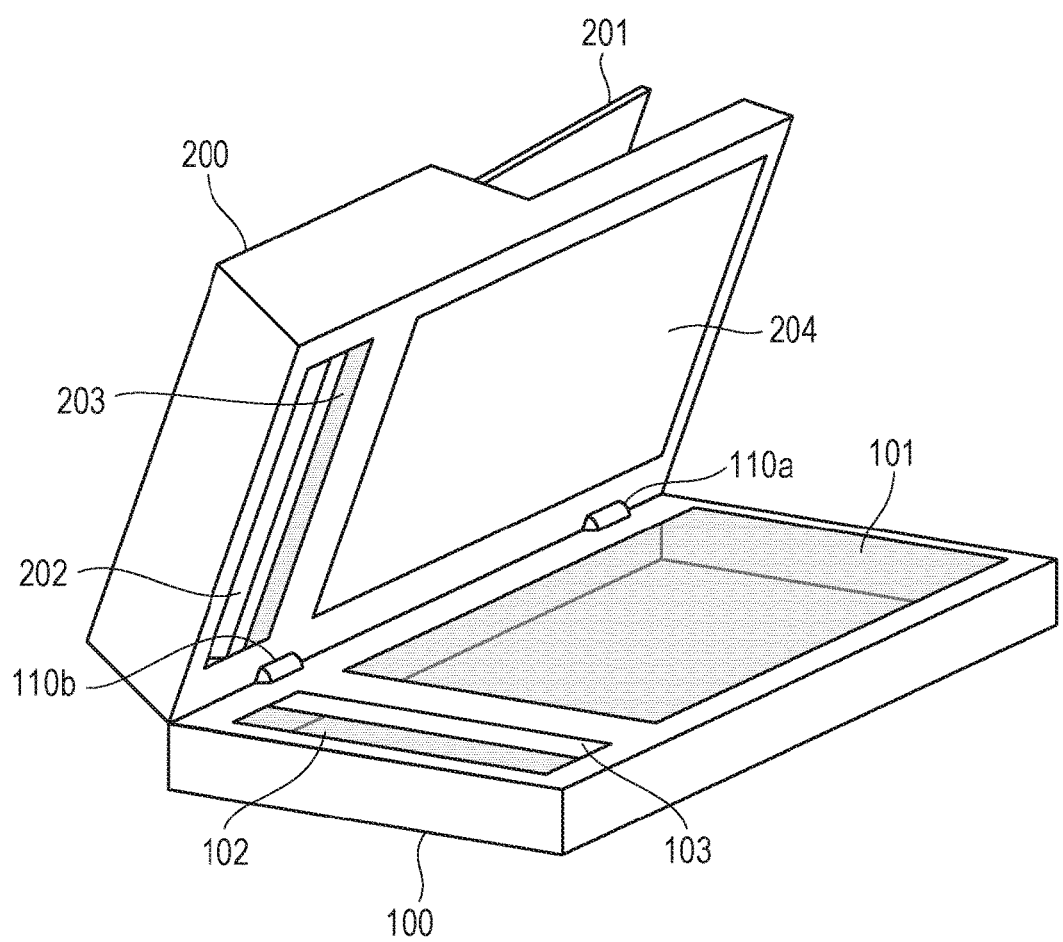
FIG. 1 is a perspective view of an image reading unit, according to one or more embodiment of the subject disclosure.

FIG. 1 is a perspective view illustrating an example of the document reading device according to the present embodiment. The document reading device according to the present embodiment includes a reading unit 100 that reads an image on a document sheet and an automatic document feeding device 200 (hereinafter, referred to as an ADF 200) that conveys a document sheet toward the reading unit 100. Further, a controller, which is not illustrated FIG. 1, is connected.

The ADF 200 is attached to the reading unit 100 by using opening/closing hinges provided in an upper and rear side of the document reading device 100 so that the ADF 200 can be opened and closed.

<Configuration Example of Reading Unit 100>

Figure 2:
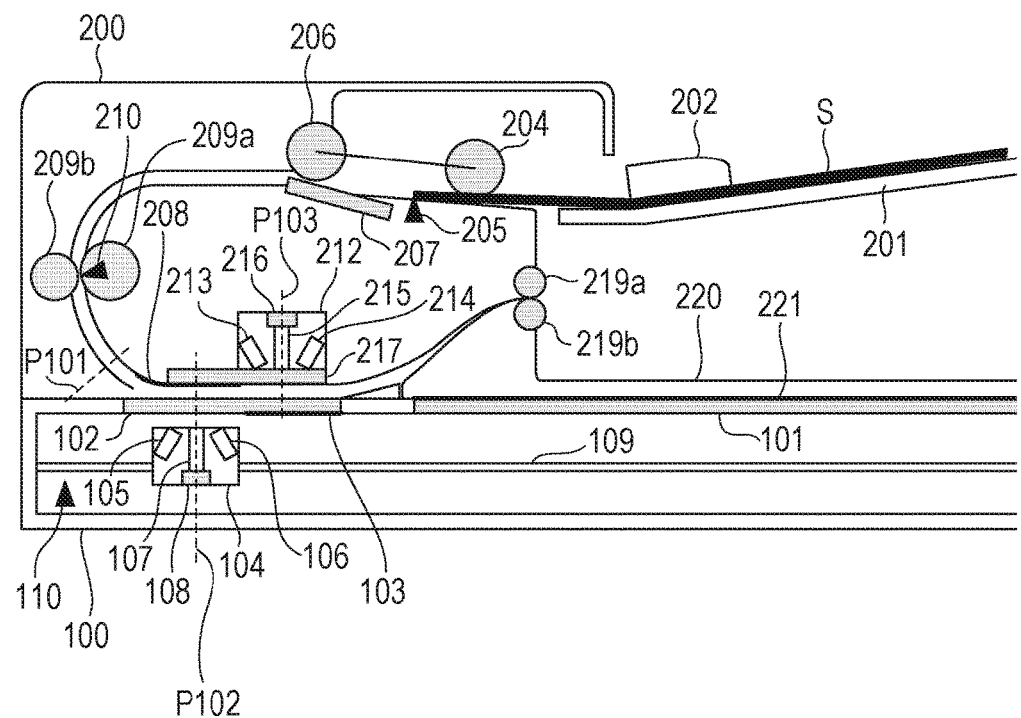
FIG. 2 is a sectional view of the image reading unit, according to one or more embodiment of the subject disclosure.

The reading unit 100 will be described with reference to FIG. 2. FIG. 2 is a sectional view illustrating an example of the document reading device according to the present embodiment.

Figure 3:
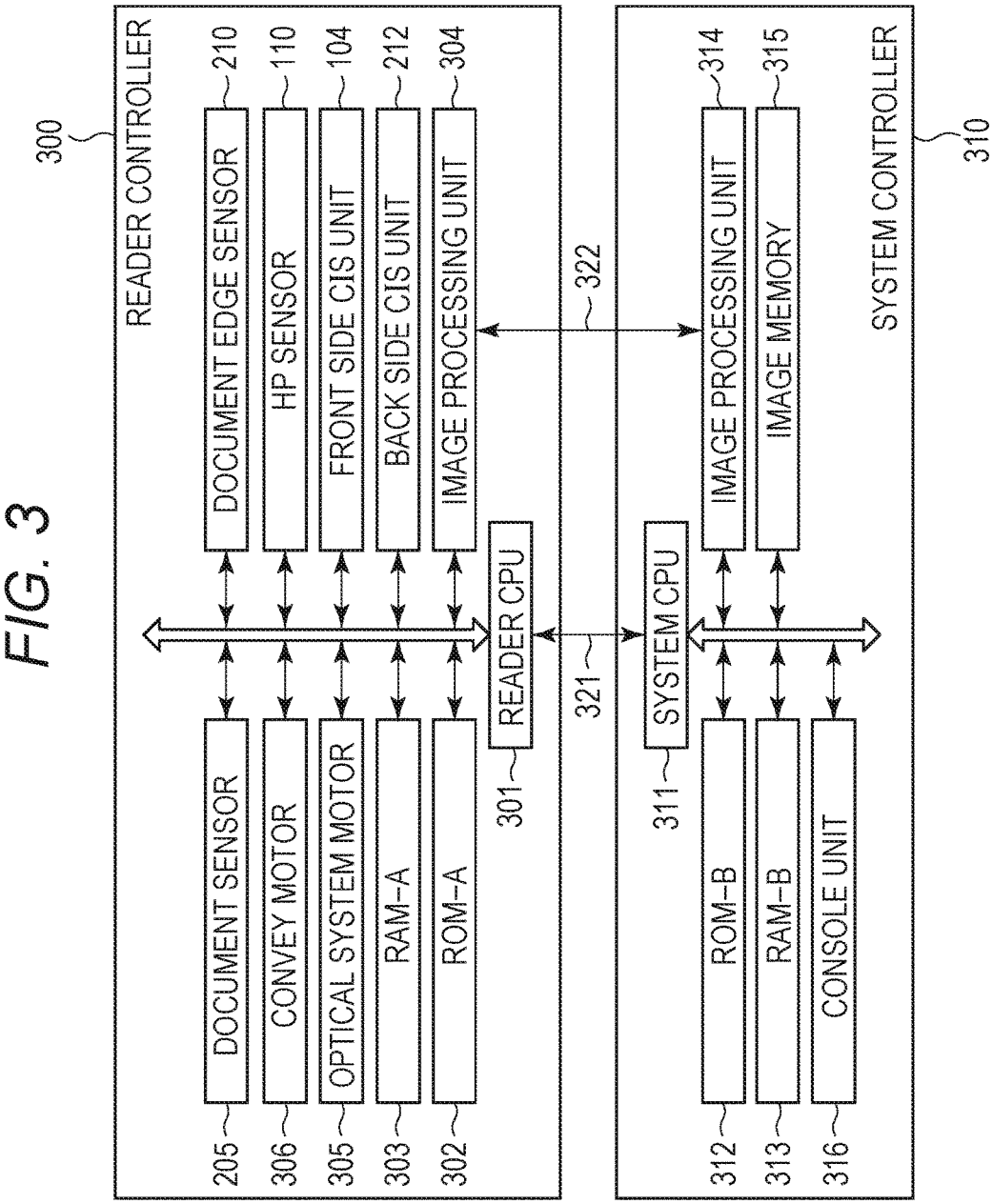
FIG. 3 is a block diagram illustrating a control configuration of the image reading unit, according to one or more embodiment of the subject disclosure.

The document reading device 100 includes a platen glass 101, a front-side reading unit 104, a movement guide 109, and a back-side white reference member 103. The reading unit 100 reads a front side image of the document sheet by reading the front side of the document sheet placed on the platen glass 101 line by line as moving the front-side reading unit 104 along the movement guide 109 by using an optical system motor 305 (FIG. 3). Here, a reading element of the front-side reading unit 104 includes a contact image sensor (CIS).

A first glass 102 is integrally formed with a back-side white reference member 103 as illustrated in FIG. 2. The image on the document sheet conveyed onto the first glass 102 by the ADF 200 is read by the front-side reading unit 104.

<Configuration Example of Automatic Document Feeding Device (ADF 200)>

The ADF 200 will be described with reference to FIG. 2. On a document tray 201, a document set S, which includes one or more document sheets, is placed. A document sensor 205 detects whether there is any document an the document tray 201. A top sheet of the document set S placed on the document tray 201 is conveyed by a pickup roller 204. From the sheet conveyed by the pickup roller 204, the top sheet is separated and conveyed by operation of a separation roller 206 and a separation pad 207. This separation is realized by a known separating technique.

The sheet separated by the separation roller 206 and the separation pad 207 is conveyed to a pair of conveying rollers 209, and further conveyed toward the first glass 102 by the pair of conveying rollers 209.

A front-side image of the document sheet which is being conveyed between the first glass 102 and a second glass 217 is read, at a front-side reading position P102, by the front-side reading unit 104 provided under the first glass 102. Here, to the second glass, a front-side white reference member 208 is attached and used for a white level correction and a shading correction in the front-side reading unit 104.

Further, in a case where it is instructed to read images on both sides of the document sheet, the back-side image on the document sheet which is being conveyed between the first glass 102 and second glass 217 is read, at a back-side reading position P103, by the back-side reading unit 212. Here, to the first glass 102, the back-side white reference member 103 is attached and used for a white level correction and a shading correction in the back-side reading unit 212.

The document sheet whose image has been read is discharged onto a discharge tray 220 by a pair of discharge rollers 219.

The configuration may include a CCD in combination with a reduction optical system using a mirror, the front-side reading unit 104, and back-side reading unit 212.

Figure 5A:
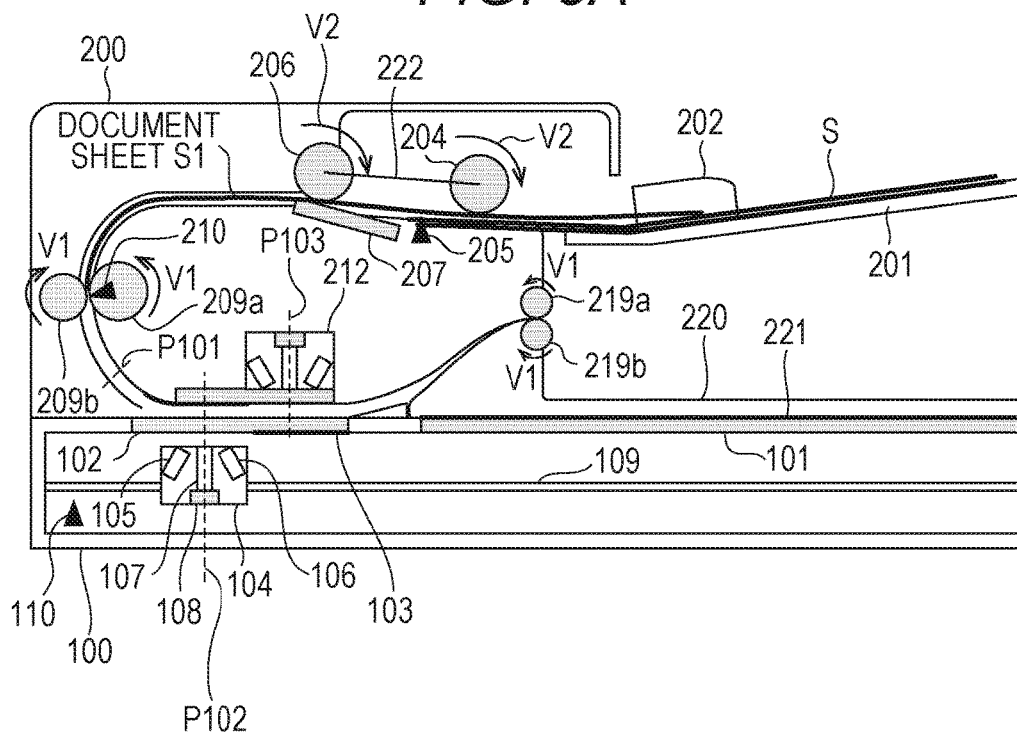
FIGS. 5A and 5B are explanatory views illustrating a case of conveying a plurality of document sheets, according to one or more embodiment of the subject disclosure.

The ADF according to the present embodiment, all the rollers including the pickup roller 204, the separation roller 206, the pair of conveying rollers 209, and the pair of discharge rollers 219 are driven to rotate by a single convey motor 306 (FIG. 3) serving as a drive source. The convey motor 306 is connected to the pickup roller 204, the separation roller 206, the pair of conveying rollers 209, and the pair of discharge rollers 219 via a gear or a drive belt. With this configuration, all the rollers are rotated by driving the convey motor 306. Further, when the convey motor 306 rotates, all the rollers related to document conveyance rotate. As illustrated in FIG. 5A, when the convey motor 306 is rotated at a certain speed V1, the pair of conveying rollers 209 and the pair of discharge rollers 219 rotate at the speed V1, and the separation roller 206 and the pickup roller 204 rotate at a speed V2 due to a speed reduction ratio of a drive gear. Here, the speed V1 is greater than the speed V2.

<Explanation of Document Separation Mechanism and Sheet-To-Sheet Interval>

FIGS. 5A, 5B, 24A to 24E, and 25 describe a document separation mechanism according to the present embodiment. With reference to these drawings, an operation that a trailing edge of the document sheet conveyed from the document tray 201 passes through the separation roller 206 and a following document sheet is separated after a predetermined interval will be described.

Firstly, as illustrated in FIG. 5A, a document sheet S1, which is a sheet separated by the pickup roller 204, the separation roller 206, and the separation pad 207 is conveyed at the speed V2 to the pair of conveying rollers 209 by the separation roller 206 and the pickup roller 204.

Figure 5B:
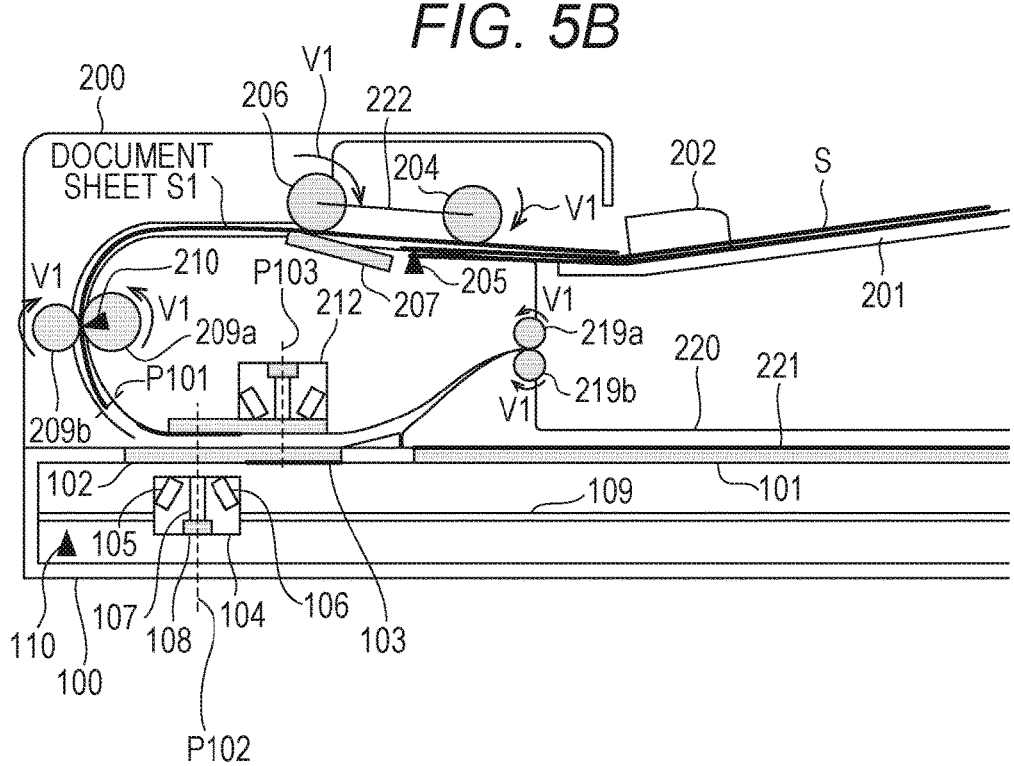

As illustrated in FIG. 5B, when the document sheet S1 comes to the pair of conveying rollers 209, the document sheet is conveyed by three rollers, namely, the separation roller 206, the pickup roller 204, and the pair of conveying rollers 209. When the document is pulled, by the pair of conveying rollers 209, in the conveyance direction at the speed V1 faster than the speed V2, the separation roller 206 and the pickup roller 204, which are rotating at the speed V2, are made to rotate following the rotation. Thus, since the separation roller 206 and the pickup roller 204 rotate at the speed V1 following the rotation of the pair of conveying rollers 209, the document sheet S1 is conveyed to the pair f conveying rollers 209 at the speed V1.

After that, as illustrated in FIG. 6A, after the trailing edge of the document sheet S1 passes through the pickup roller 204, the following state of the pair of conveying rollers 209 is canceled and the pickup roller 204 starts to rotate at the speed V2. In this case, the pickup roller 204 stops the rotation for a short period of time by a later described mechanism. With this configuration, transmission of a conveying force to a following document sheet is blocked and then the transmission of the conveying force to the following document sheet is restarted. In other words, the following document sheet is not conveyed until the transmission of the conveying force is restarted.

With reference to FIGS. 24A to 24E, a mechanism for driving the pickup roller 204 will be described. This is a mechanism that can rotate or stop the pickup roller 204 by transmitting the drive force from the convey motor 306 to the pickup roller 204 with a time lag. To the pickup roller 204, a rotating member 230 that rotates integrally with the roller is provided, and a groove is provided at a part of an outer surface of the rotating member 230. A projection portion 232 of a shaft member 231 that rotates with a rotation shaft 233, to which the drive of the convey motor 306 is transmitted, moves along the groove of the rotating member 230.

Figure 24A:
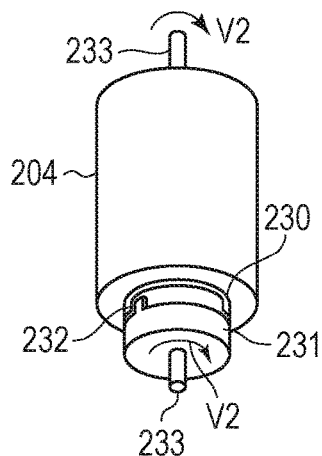
FIGS. 24A to 24E are explanatory views illustrating a time lag roller in a document separation mechanism, according to one or more embodiment of the subject disclosure.
Figure 24B:
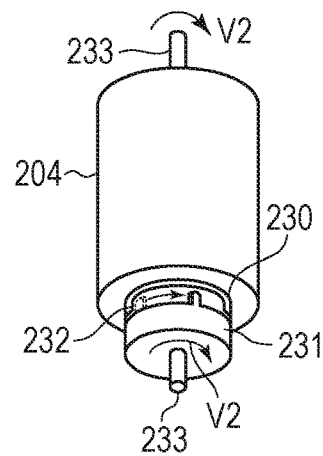
Figure 24C:
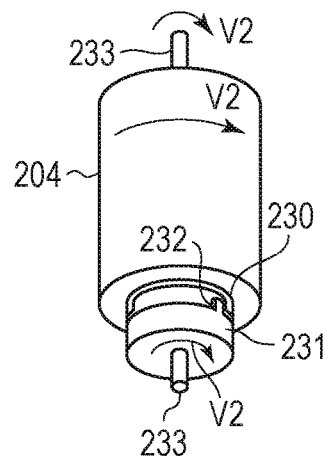
Figure 24D:
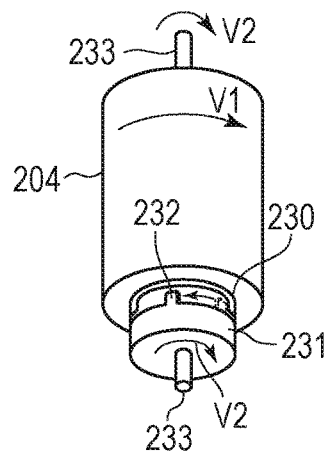
Figure 24E:
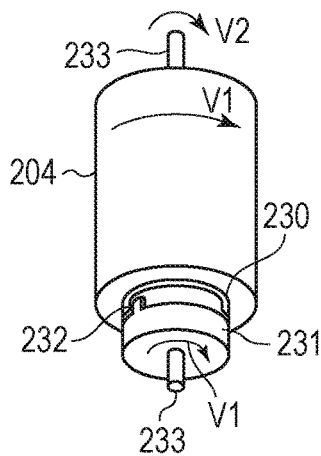

FIG. 24A illustrates a state that the trailing edge of the document sheet S1 has passed through the pickup roller 204, the pickup roller 204 is being stopped, and the rotation shaft 233 keeps rotating. After this state, the projection portion 232 moves along the groove of the rotating member 230 because of the rotation of the rotation shaft 233 as illustrated in FIG. 24B. In this case, the pickup roller 204 is kept stopped. Then, as illustrated in FIG. 24C, when the projection portion 232 comes to an end of the groove of the rotating member 230, the drive force is transmitted to the pickup roller 204. Thus, the restart of the rotation of the pickup roller 204 delays by an amount of the time corresponding to the length of the groove of the rotating member 230. Further, as described above, when the pickup roller 204 is driven following the speed V1 of the pair of conveying rollers 209, as illustrated in FIG. 24D, the shaft member 231 keeps rotating at the speed V2 of the rotation shaft 233 but the projection portion 232 is relatively moved in direction opposite to the rotating direction. Then, the pickup roller 204 keeps rotating at the speed V1. When the projection portion 232 returns to the state of FIG. 24E, the rotation force of the rotation shaft 233 is separated from the shaft member 231 and rotates with the pickup roller 204 at the speed V1.

Figure 25:
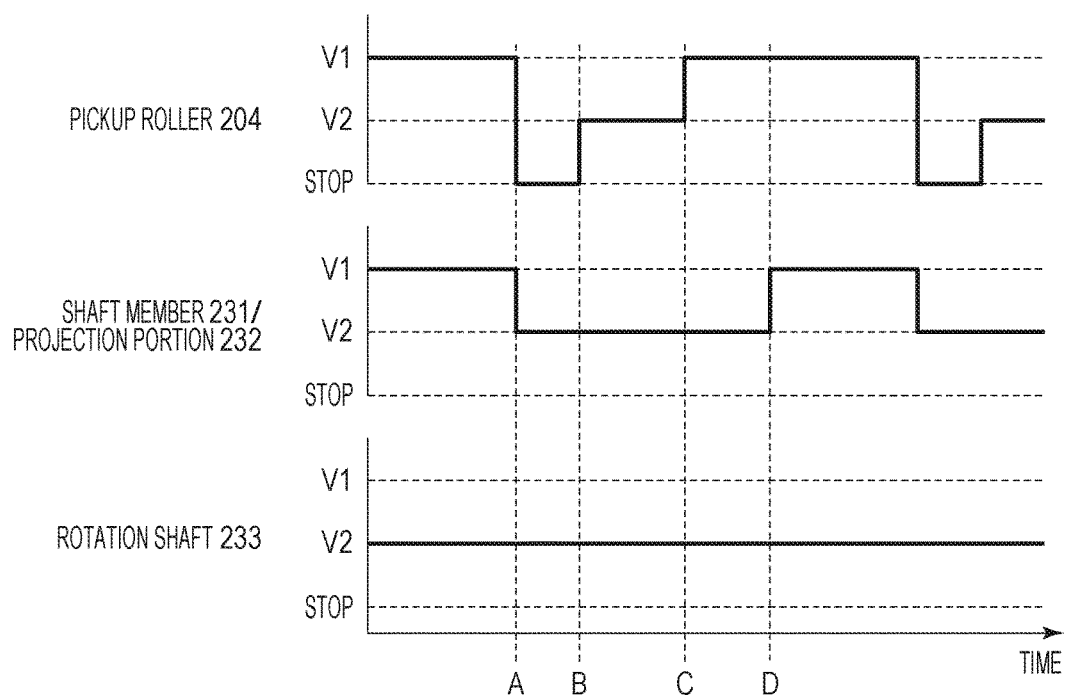
FIG. 25 is a diagram illustrating speed of the document separation mechanism, according to one or more embodiment of the subject disclosure.

FIG. 25 is a diagram illustrating a speed relationship between the pickup roller 204, rotation shaft 233, shaft member 231, and the projection portion 232 of the above timings. Time A corresponds to the state of FIG. 24A, Time B corresponds to the state of FIG. 24C, and Time D corresponds Lo the state of FIG. 24E. When the trailing edge of the document passes though the pickup roller 204 at Time A, the rotation of the pickup roller 204 stops and the shaft member 231 and the projection portion 232 rotate at the speed V2. When the projection portion 232 comes to an end of the groove of the rotating member 230 at Time B, the pickup roller 204 rotates at the speed V2. Time C represents a timing that a leading edge of the document sheet reaches to the pair of conveying rollers 209. At this timing, the pickup roller 204 rotates at the speed V1 as described above. Then, at Time D, the end of the groove of the rotating member 230 contacts with the projection portion 232 and the shaft member 231 also rotates at the speed V1.

Figure 7A:
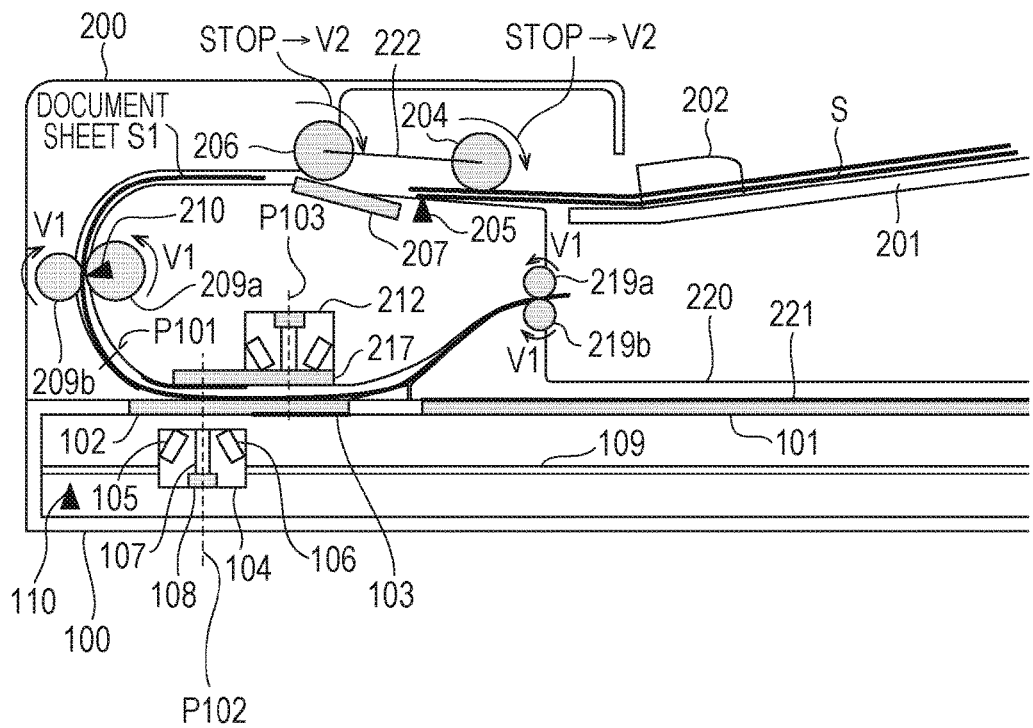
FIGS. 7A and 7B are explanatory 7B views illustrating a case of conveying the plurality of document sheets, according to one or more embodiment of the subject disclosure.
Figure 7B:
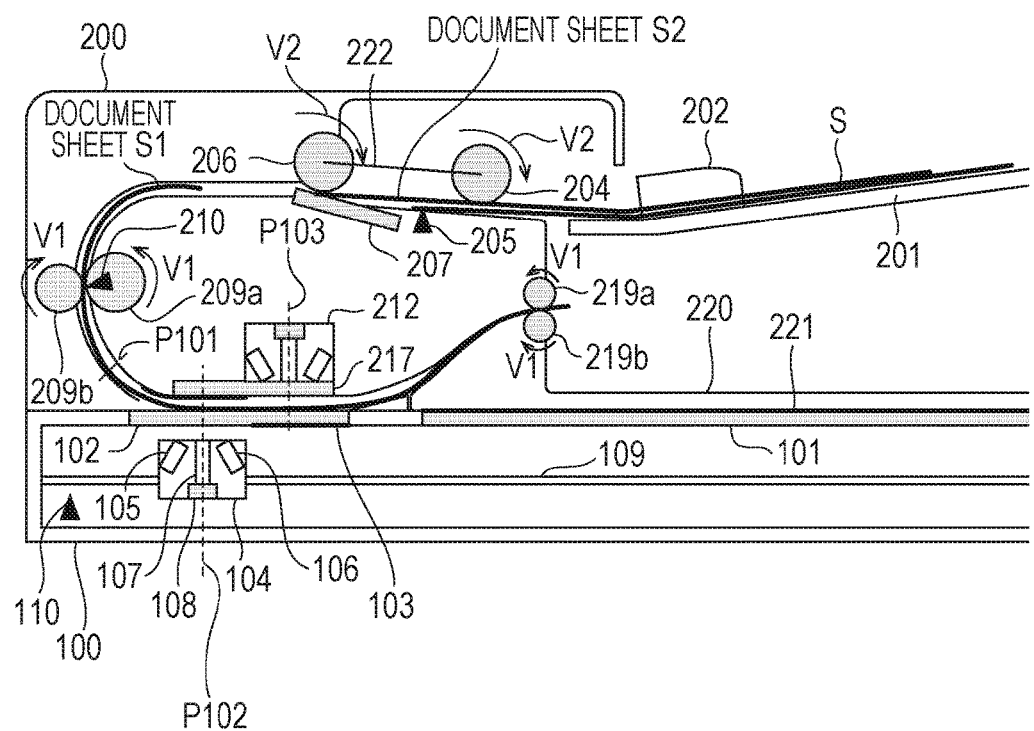
Figure 8A:
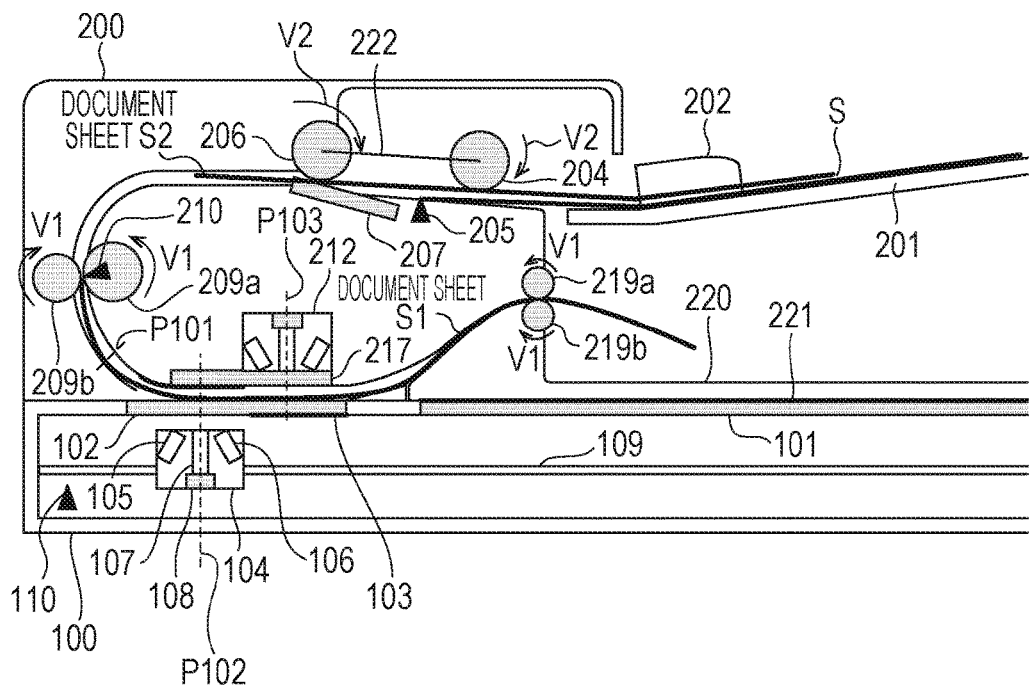
FIGS. 8A and 8B are explanatory 8B views illustrating a case of conveying the plurality of document sheets, according to one or more embodiment of the subject disclosure.

After that, as illustrated in FIG. 6B, when the trailing edge of the document sheet S1 has passed through the separation roller 206, the following state of the separation roller 206 and the pair of conveying rollers 209 is canceled and the separation roller 206 starts to rotate at the speed V2. In this case, as in the pickup roller 204, the separation roller 206 has, in its rotation shaft, a mechanism that drives the roller with a time lag. With this configuration the separation roller 206 stops for a short period of time. Then, when the drive from the convey motor 306 is transmitted to the separation roller 206 after the short period of time, as illustrated in FIG. 7A, the separation roller 206 and the pickup roller 204 rotate at the speed V2. When the rotating force of the pickup roller 204 is transmitted to a document sheet S2 that follows, a separation of the document sheet S2 is started (FIG. 7B). After that, as described above, the document sheet S2, which is a single sheet, is separated and conveyed by the separation roller 206 and the separation pad 207 (FIG. 8A).

Figure 8B:
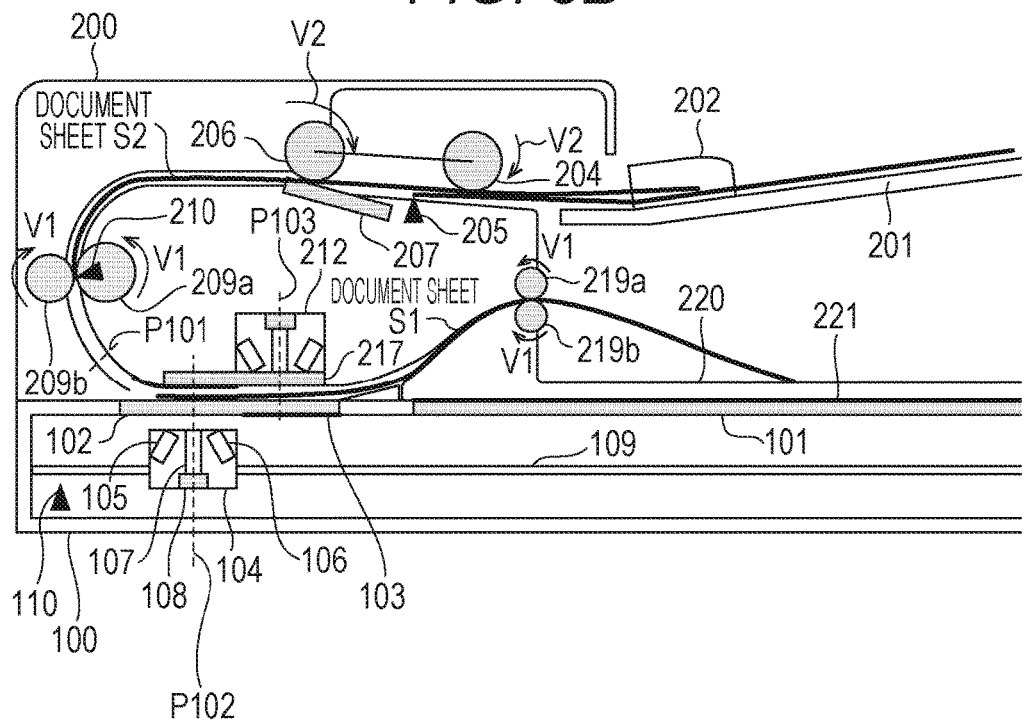

Since the conveyance speed V1 of the preceding document sheet S1 is greater than the conveyance speed V2 of the document sheet S2 (V1>V2), the interval between the document sheet S1 and the document sheet S2 becomes larger. Then, as illustrated in FIG. 8B, when the document sheet S2 comes to the pair of conveying rollers 209 and, thus, the conveyance speed of the document sheet S2 becomes V1. Consequently, a necessary interval (a predetermined interval between documents) is generated between the document sheet S1 and the document sheet S2.

<Description of Block Diagram>

FIG. 3 is a block diagram illustrating a configuration example of a control unit of the image reading unit, which includes the ADF 200, according to the present embodiment. A reader controller 300 includes a reader CPU 301, which is a central processing unit, a reader ROM 302, and a reader RAM 303. The reader ROM 302 stores a control program, and the reader RAM 303 includes input data and operation data. According to the flowchart illustrated in FIG. 4, the reader CPU 301 executes the control program.

To the reader CPU 301, the convey motor 306 that drives each conveyance roller is connected to realize a document conveyance function. Further, the document sensor 205 that detects a document placed on the document tray 201 and a document edge sensor 210 that detects whether there is a document (the leading edge and trailing edge) on the document conveyance path are also connected. The convey motor 306 according to the present embodiment is a pulse motor and the reader CPU 301 controls the drive of the motor by controlling the number of drive pulses provided to the convey motor 306. The number of the pulses can be taken as a conveyance distance of the document which is being conveyed, and the reader CPU 301 conveys the document. by controlling each load based on the conveyance distance calculated from the motor pulses.

According to a read request from a system CPU 311, the reader CPU 301 transfers image data read by the front-side reading unit 104 or back-side reading unit 212 to a read image processing unit 304. The reader CPU 301 transmits the image data that the read image processing unit 304 performs various image processing thereon to a system controller 310 via an image data bus 322. Further, the reader CPU 301 transmits a vertical synchronization. signal which serves a reference of the leading edge of the document image data and a horizontal synchronization signal which serves as a pixel leading edge of one line to the system controller 310 according to document read timings via an unillustrated controller IF.

The system controller 310 includes a system CPU 311, a system ROM 312, and a system RAM 313 and transmits and receives data related to an image reading control to and from the reader CPU 301 via a command data bus 321. The image data processed in the read image processing unit 304 is transferred to a system image processing unit 314 in the system controller 310 via the image data bus 322, a predetermined image processing such as a color determination is performed thereon, and the processed image data is stored in an image memory 315. Further, the system controller 310 also includes a console unit 316 and transfers an instruction from a user input via the console unit 316 to the system CPU 311 and controls the console unit 316 to show display information from the system CPU 311.

<Description of Stopping Determination Position and Reading Position>

In FIG. 2, the front-side image of the document is read at a position of P102, and the back-side image is read at a position of P103. A stopping determination position used to determine whether to temporarily stop the document conveying is set at a predetermined position (position P101) being away by a predetermined distance upstream of the front-side reading position P102.

The stopping determination position P101 is a position used to start a stopping control to stop the convey motor 306 in a case where the reader CPU 301 has not received a read request from the system CPU 311 at a timing when the document leading edge reaches to the position P101 during a document reading control.

<Description of Defective Image Output Caused by Temporarily Stopping>

Here, a defective image output in a case where the convey motor 306 is temporarily stopped during a reading control will be described with reference to FIGS. 22A, 22B, 23A and 23B. According to the present embodiment, one line in main scanning of the original is read corresponding to one step of the drive pulses of the convey motor 306. An image read timing of one line in main scanning and the motor drive pulse in one step are independent from each other and the image read timing of one line in main scanning is constantly generated at a certain interval. FIG. 22A illustrates pulses indicating image read timings of the respective lines in main scanning, and FIG. 22B illustrates motor drive pulses before and after the stopping control is started. At the image read timing, image reading for one line is started at a rising edge of a pulse. The motor is driven for one step at a rising edge of a motor drive pulse. When the stopping control starts during image reading and the motor speed is reduced, the number of image reading lines par one step of the motor drive pulse increases. As a result, as illustrated in FIG. 23A, compared to the image in FIG. 23A which is properly read, the image in FIG. 23B that a stopping control is performed during being read becomes a defective image in which a part after the position the stopping control is started is elongated in a sub scanning direction.

<Description of Document Conveyance State Abnormality Determination>

A document conveyance control according to the present embodiment will be described with reference to the flowchart of FIG. 4 and FIGS. 9A to 13B. The flowchart illustrated in FIG. 4 is executed by the reader CPU 301.

Figure 4:
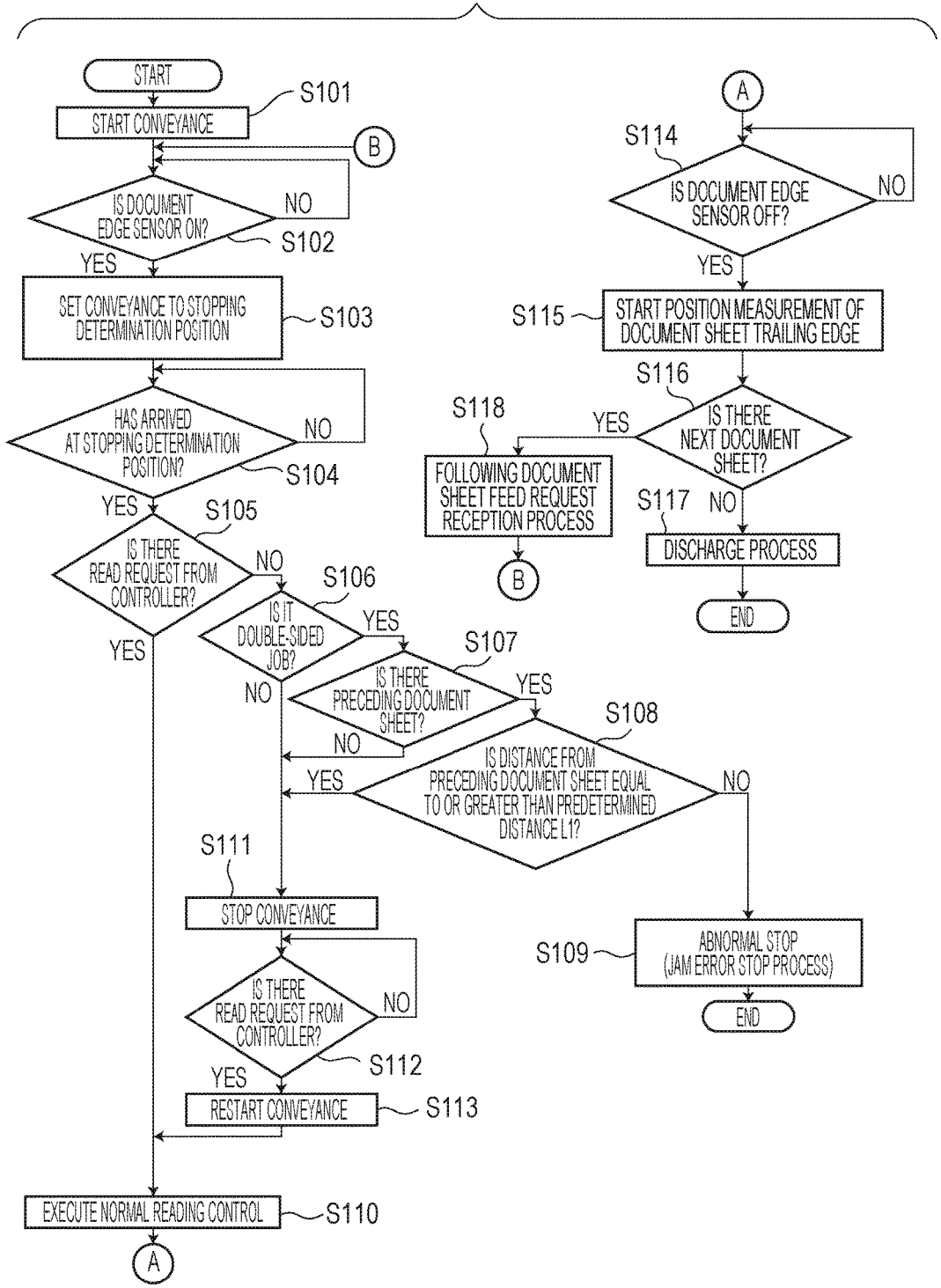
FIG. 4 is a control flowchart, according to one or more embodiment of the subject disclosure.

Firstly, when a sheet feed request is sent from the system CPU 311 to the reader CPU 301 in the reader controller 300 via the command data bus 321 while a document is being detected by the document sensor 205, the flowchart of FIG. 4 is started. Here, to the sheet feed request, reading mode information indicating a one-sided reading job or a double-sided reading job is included.

Figure 10A:
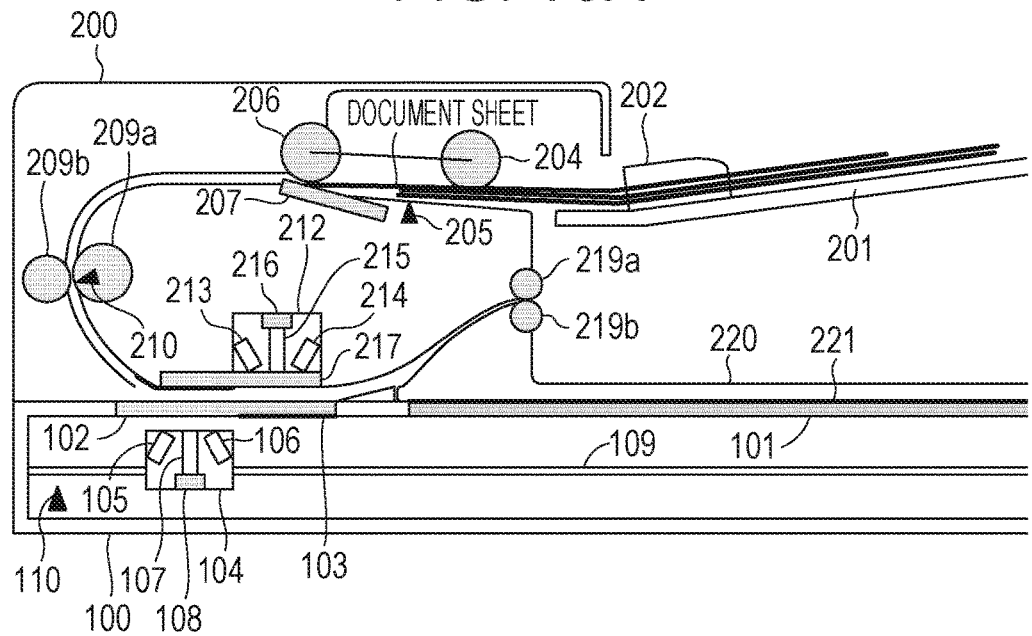
FIGS. 10A and 10B are explanatory views illustrating a case of conveying the plurality of document sheets, according to one or more embodiment of the subject disclosure.

In S101, the reader CPU 301 drives the convey motor 306 and starts to separate the document sheet by rotating the pickup roller 204 and separation roller 206 (the state of FIG. 10A). Further, the reader CPU 301 stores the reading mode included in the sheet feed request the reader RAM 303.

Figure 10B:
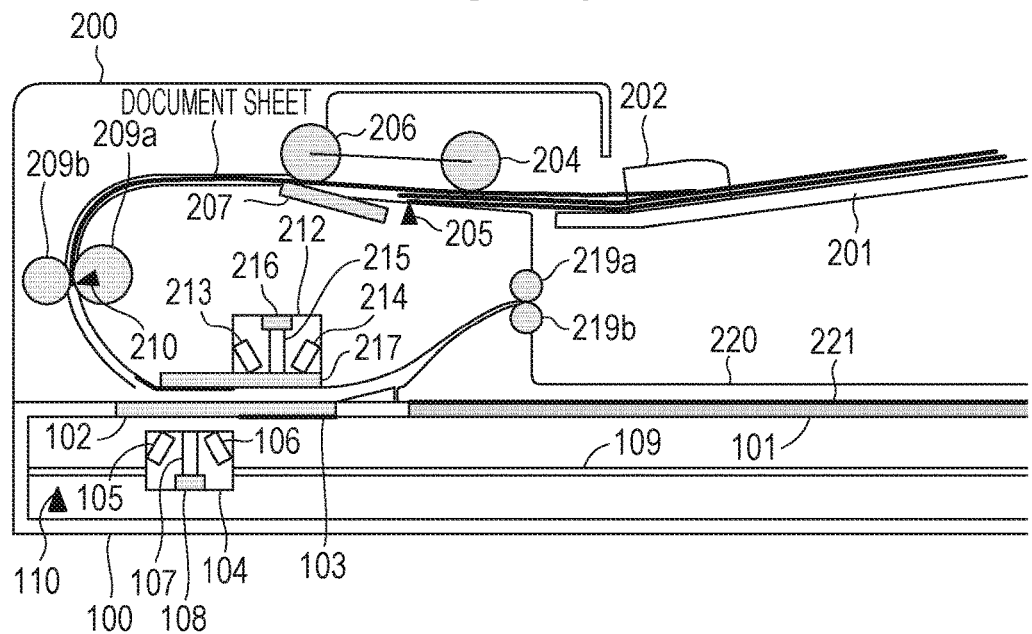

The separated document sheet is conveyed to the conveying rollers 209 and, in S102, the reader CPU 301 waits until the document edge sensor 210 provided at the conveying rollers 209 is turned on (detects the leading edge) (the state of FIG. 10B).

When detecting that the document edge sensor 210 is turned on, the reader CPU 301 sets a target value of the number of motor pulses until the document sheet comes to the stopping determination position P101 from the document edge sensor 210 (S103). After that the reader CPU 301 determines whether the document sheet comes to the stopping determination position P101 based on the count value of the number of the motor pulses (S104).

Figure 11A:
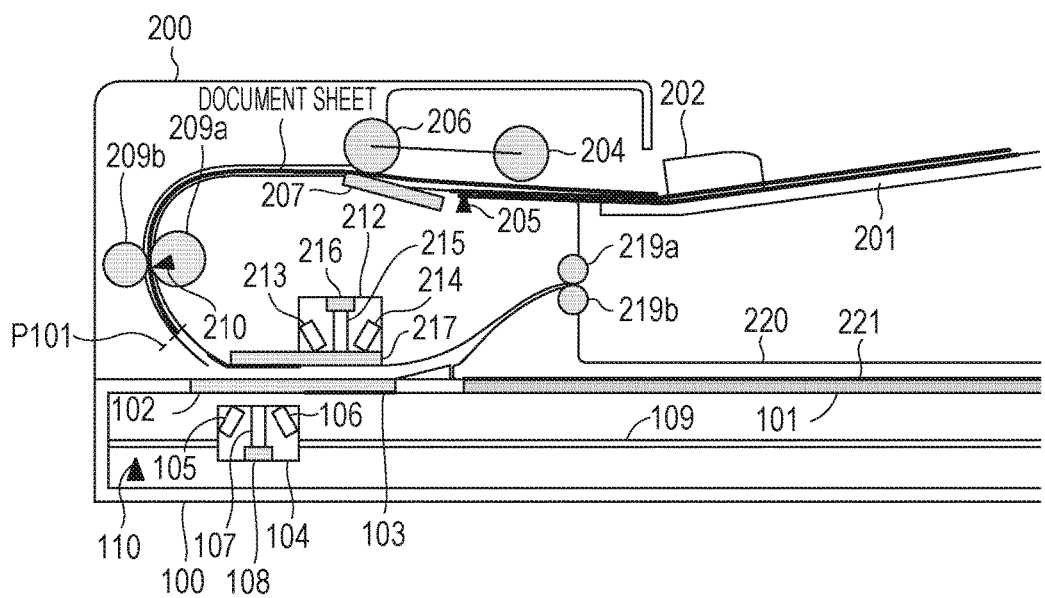
FIGS. 11A and 11B are explanatory views illustrating a case of conveying the plurality of document sheets, according to one or more embodiment of the subject disclosure.

The reader CPU 301 determines that the document sheet has come to the stopping determination position P101 when the count of the number of the motor pulses reaches the target value (the state of FIG. 11A).

When the document sheet has come to the stopping determination position P101, the reader CPU 301 determines whether a read request has transmitted from the system CPU 311 (S105). Here, the read request is transmitted from the system CPU 311 for every document. When a reading request is sent, it is assumed that the reading operation is performed, and a normal reading control is executed in S110. When a reading request is not set, the reader CPU 301 determines whether the reading mode stored in the reader RAM 303 is a double-sided reading job (S106). When the reading mode is a one-sided reading job, the stopping control is executed in S111. In a stopping control, the document conveyance is stopped but LEDs, which are light sources of the front-side reading unit 104 and back-side reading unit 212, are kept turned on. When the reading mode stored in the reader RAM 303 is a double-sided reading job, the reader CPU 301 determines whether there is a document sheet (hereinafter, referred to as a preceding document sheet) which is read before the document sheet (target sheet) which has come to the stopping determination position P101 (S107). When there is no preceding document sheet, the reader CPU 301 performs a stopping control and, when there is a preceding document sheet, the reader CPU 301 calculates a distance L2 between a trailing edge of the preceding document sheet and a leading edge of the target sheet (S108).

Figure 9A:
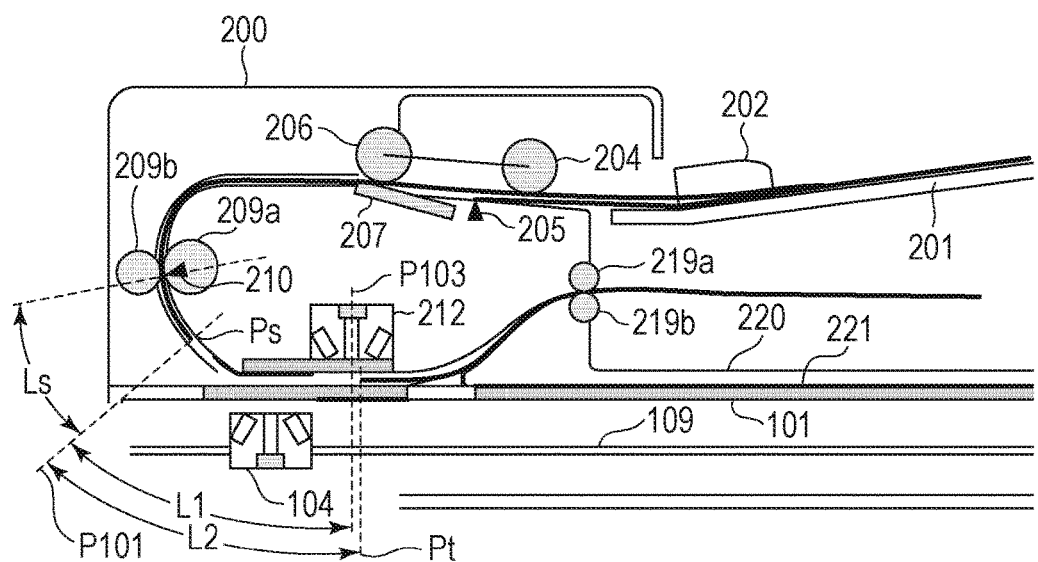
FIGS. 9A and 9B are explanatory views illustrating a normal condition and an abnormal condition of the document conveyance, according to one or more embodiment of the subject disclosure.
Figure 9B:
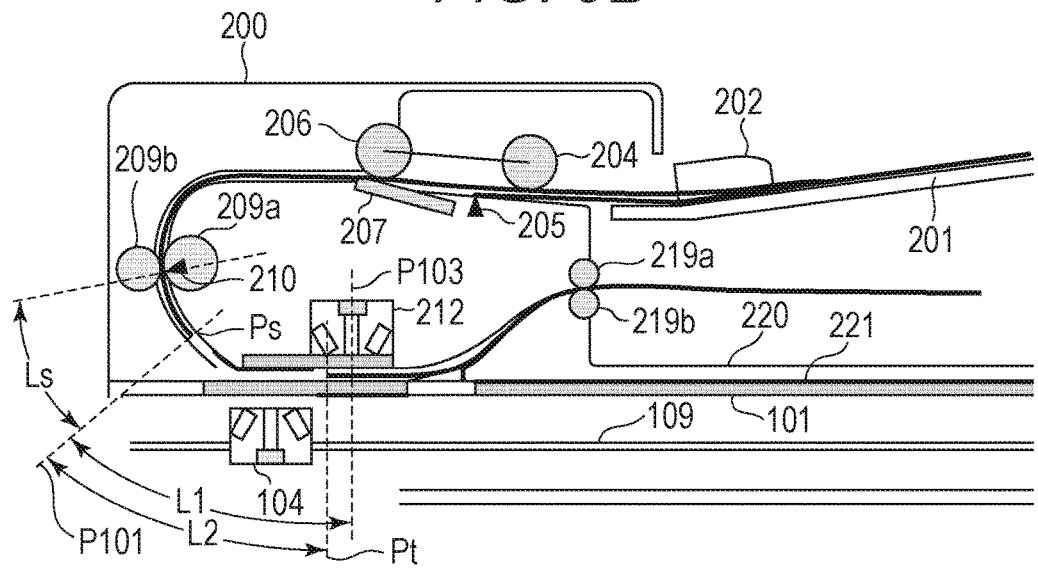

FIGS. 9A and 9B are diagrams illustrating a positional relationship between the leading edge of the target document sheet and the trailing edge of the preceding document sheet. The reader CPU 301 compares the distance L1 and distance L2 illustrated in FIGS. 9A and 9B. The distance L1 is a distance between the leading edge Ps of the target document sheet (the same position as the stopping determination position P101) and the back-side reading position P103. The distance L2 is a distance between the target document sheet leading edge Ps and the trailing edge Pt of the preceding document sheet. When the distance L2 is greater than the distance L1 (the state of FIG. 9A), the reader CPU 301 determines that the trailing edge of the preceding document sheet has passed through the back-side reading position P103 and executes a stopping control in S111. In this case, even when the stopping control is executed, it will not have an effect on the image data on the trailing edge of the preceding document sheet.

As illustrated in FIG. 9B, when the distance L2 is smaller than the distance L1, it is determined that the trailing edge of the preceding document sheet Pt has not passed through the back-side reading position P103, and an abnormal stop control is executed in S109. In this case, since the read image on the trailing edge of the preceding document sheet becomes a defective image (an image elongated in a sub scanning direction), the read image of the preceding document sheet cannot be used. Thus, it is determined that the preceding document sheet is jammed and a re-reading of a jammed document sheet is performed after a jam release process.

The distance L2 between leading edge Ps of the target document sheet and the trailing edge Pt of the preceding document sheet (the distance between the document sheets) is calculated as follows.

A distance calculated based on the number of motor pulses from the timing when the trailing edge of the document sheet (preceding document sheet) which is being read turns off (passes through) the document edge sensor 210 to the timing when the trailing edge comes to the back-side reading position P103 is set as P1. Then, the distance calculated based on the number of motor pulses from the timing when the leading edge of the following document sheet (target document sheet) turns on the document edge sensor 210 to the timing when the leading edge comes to the stopping determination position P101 is set as P2. The distance L2 is calculated by P1-P2.

The distance Ls from the document edge sensor 210 to the stopping determination position P101 is the same distance as P1. Thus, the distance L1 between the stopping determination position P101 and the back-side reading position P103 is a distance in which Ls is subtracted from the distance between the document edge sensor 210 and the back-side reading position P103 according to the previously determined component layout.

When the distance L2 is smaller than the distance L1 in S108, the reader CPU 301 determines that the read image of the preceding document sheet is a defective image and performs an abnormal stop control in S109. In the abnormal stop control, the preceding document sheet is handled as a jammed paper, and the document conveyance and the reading operation by the reading units 104 and 212 are stopped (including turning off the LEDs). When the reading operation is stopped, the image data read from the preceding document sheet is discarded as an invalid image.

As described above, when a read request of the target document sheet is not received before the target document sheet comes to the stopping determination position P101, the reader CPU 301 stops the document conveyance. As a result, the conveyance of the preceding document sheet is stopped. If the trailing edge of the preceding document sheet does not come to the back-side reading position P103, the reader CPU 301 stops the reading operation as a result of an abnormal stop control. On the other hand, if the trailing edge of the preceding document sheet has passed through the back-side reading position P103, the read image of the preceding document sheet is valid and, thus, the reader CPU 301 executes the stopping control to standby to restart the conveyance of the document.

If the reader CPU 301 has received a read request from system CPU 311 before the target document sheet comes to the stopping determination position P101, the back-side image of the preceding document sheet is still being read. However, the determination process in S105 to S108 is not performed regardless of the distance from the preceding document sheet assuming that it is ready to read the image of the following document sheet (target document sheet).

In the stopping control in S111, the reader CPU 301 gradually reduces the speed of the convey motor 306 and stops the drive of the convey motor 306 after counting the motor pulses corresponding to a predetermined distance. After that, in S112, the reader CPU 301 waits a read request from the system CPU 311 as keeping the convey motor 306 stopped. When a read request is received from the system CPU 311, the reader CPU 301 restarts the drive of the convey motor 306 in S113 to restart to convey the target document sheet.

Figure 11B:
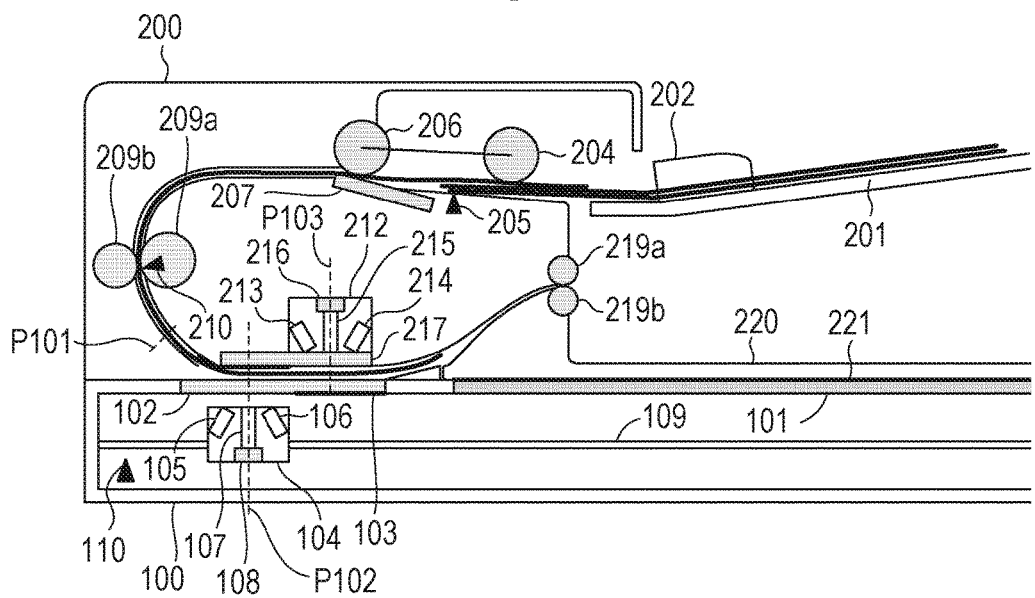

In S110, the reader CPU 301 reads the image data by a normal reading control, that is, by using the front-side reading unit 104 and back-side reading unit 212 (the state in FIG. 11B).

Figure 12A:
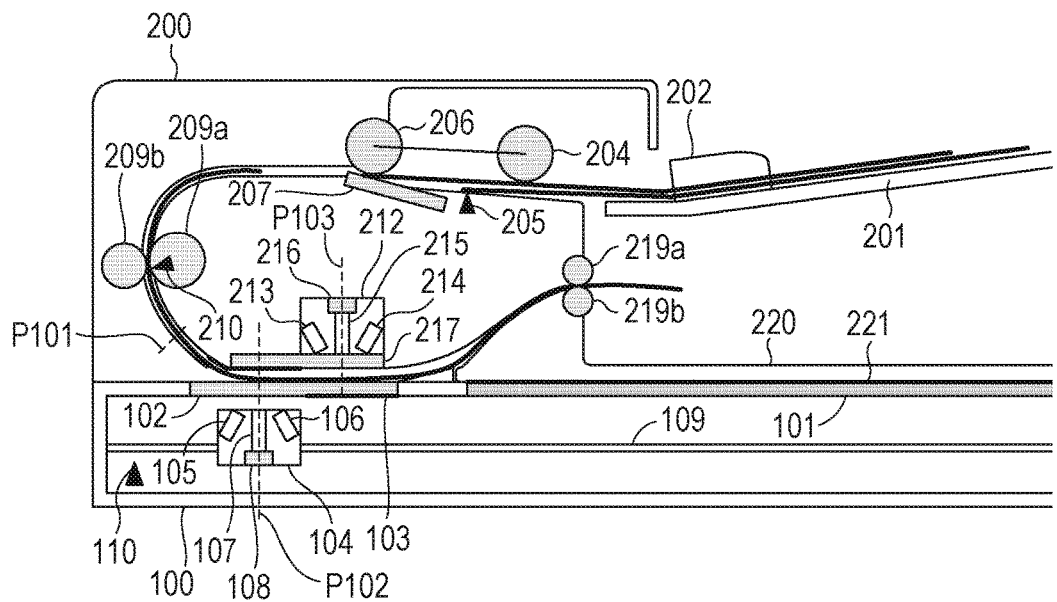
FIGS. 12A and 12B are explanatory views illustrating a case of conveying the plurality of document sheets, according to one or more embodiment of the subject disclosure.
Figure 12B:
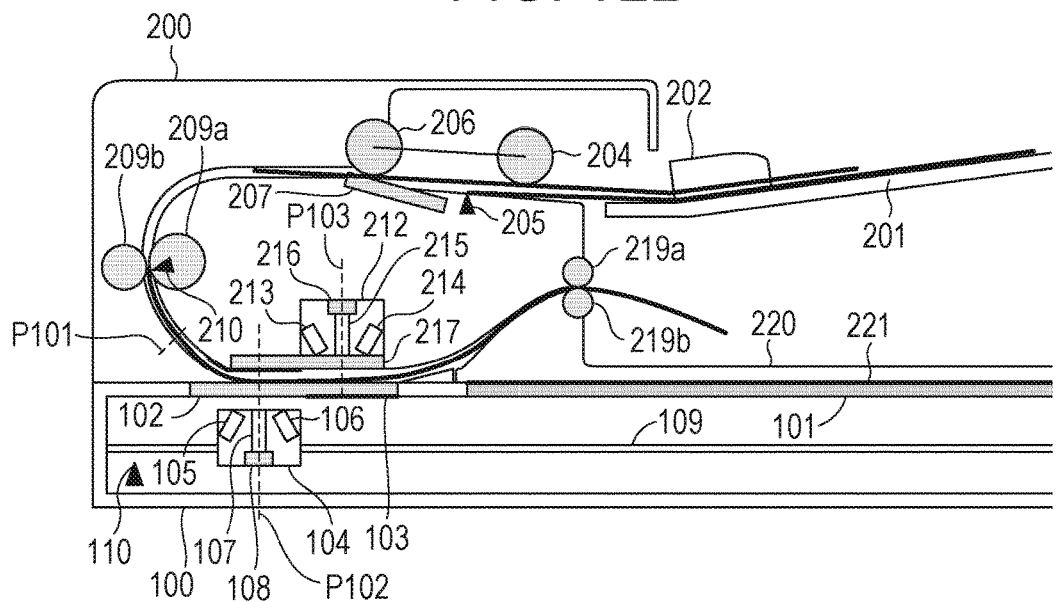
Figure 13A:
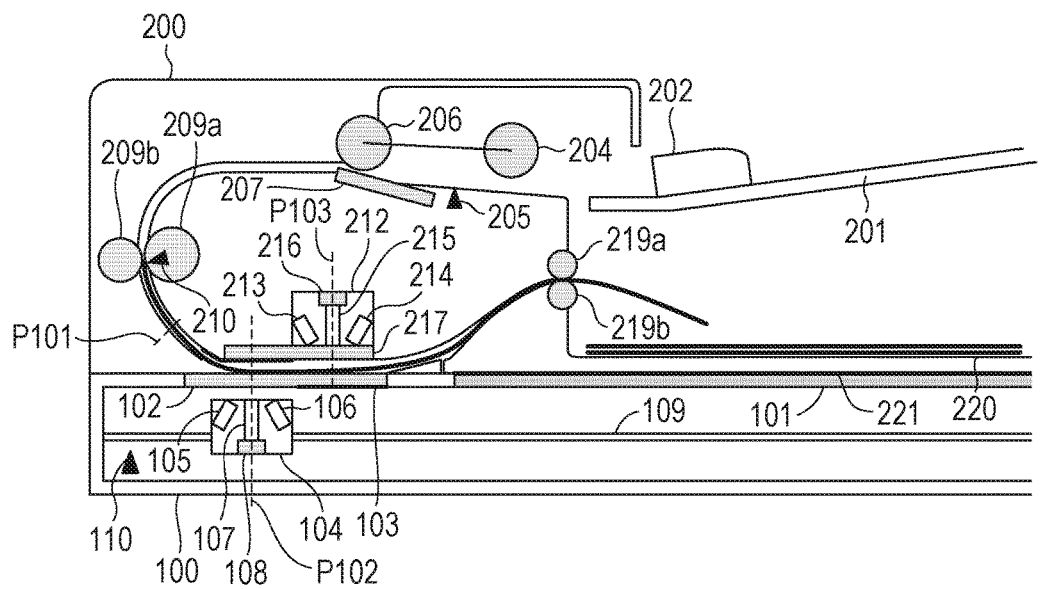
FIGS. 13A and 13B are explanatory views illustrating a case of conveying the plurality of document sheets, according to one or more embodiment of the subject disclosure.
Figure 13B:
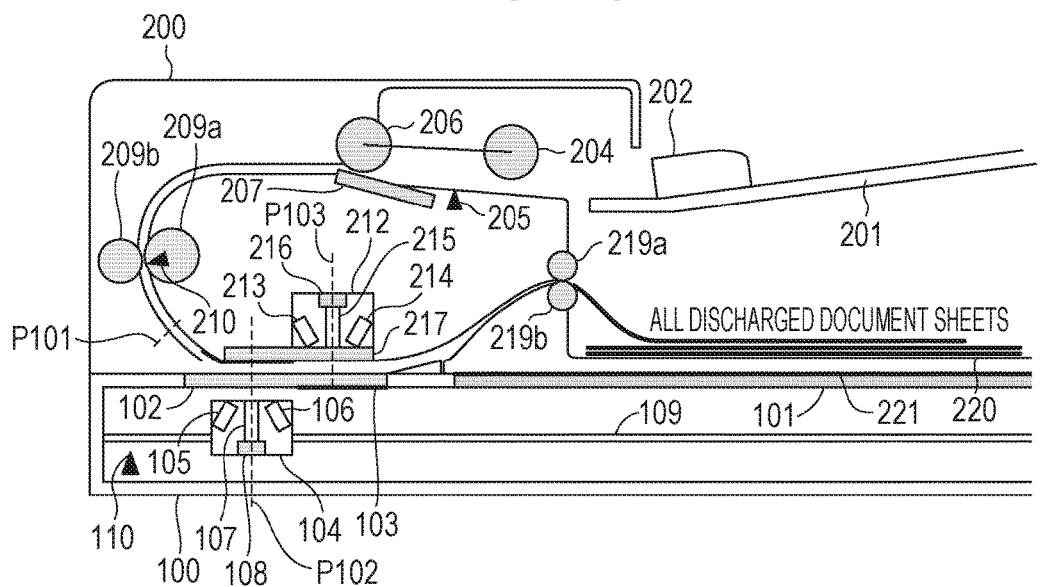

After the trailing edge of the document sheet passes through the separation roller 206 during the reading control execution, when there is a document sheet remained on the document tray 201, with the above described document separation configuration, a separation of the following document sheet is automatically started after a predetermined period of time (the state of FIG. 12A).

After that, in S114, the reader CPU 301 waits that the document edge sensor 210 is turned off during the reading control. Upon detecting that the document edge sensor 210 is turned off (the state of FIG. 12B), the reader CPU 301 starts to measure the position of the trailing edge of the document sheet to measure the distance to the following document sheet (S115). The measurement of the position of the trailing edge of the document sheet is performed based on the count of the number of motor pulses. Then, the reader CPU 301 checks whether there is any following document based on an output from the document sensor 205 (S116). When the document sensor 205 is OFF, that is, there is not any following document (the state of FIG. 13A), the reader CPU 301 performs a discharge process for discharging the document sheet to the discharge tray 220 in S117 (the state of FIG. 13B) and ends the reading. When the document sensor 205 is on, that is, there is a following document in S116, the reader CPU 301 receives a sheet feed request of the following document from the system CPU 311 in a following document sheet feed request receiving process in S118. Here, when it is found that there is a following document, regardless of the conveyance state of the document sheet, the system CPU 311 transmits a sheet feed request of the following document sheet to the reader CPU 301.

Upon receiving the sheet feed request of the following document sheet, the reader CPU 301 waits that the document edge sensor 210 turns on in S102 since the above described separation mechanism has already started the conveyance. The reader CPU 301 executes the above process until there is no more document sheet on the document tray 201.

Further, the predetermined distance in S108 is a distance between the stopping determination position P101 and back-side reading position P103 in a case of a double-sided reading job. However, when a one-sided reading job is performed, an abnormal condition can be also detected in a same manner in the one-sided reading job by setting the predetermined distance to a distance between the stopping determination position P101 and front-side reading position P102.

As described above, in a document reading device including an ADF in which respective conveying rollers are driven by a single motor, even when a stopping control is needed during a reading control, if document sheets are being conveyed with a document interval less a predetermined distance, it is detected as an abnormal condition and the reading operation is stopped. With this configuration, even in a case where the document conveyance is stopped, it can avoid outputting a defective image.

Second Embodiment

Next, a second embodiment of the present disclosure will be described. According to the second embodiment, the difference from the first embodiment is that a plurality of stopping determination positions is provided. In the second embodiment, the description of a configuration which is similar to that in the first embodiment will be made briefly or omitted.

Figure 14:
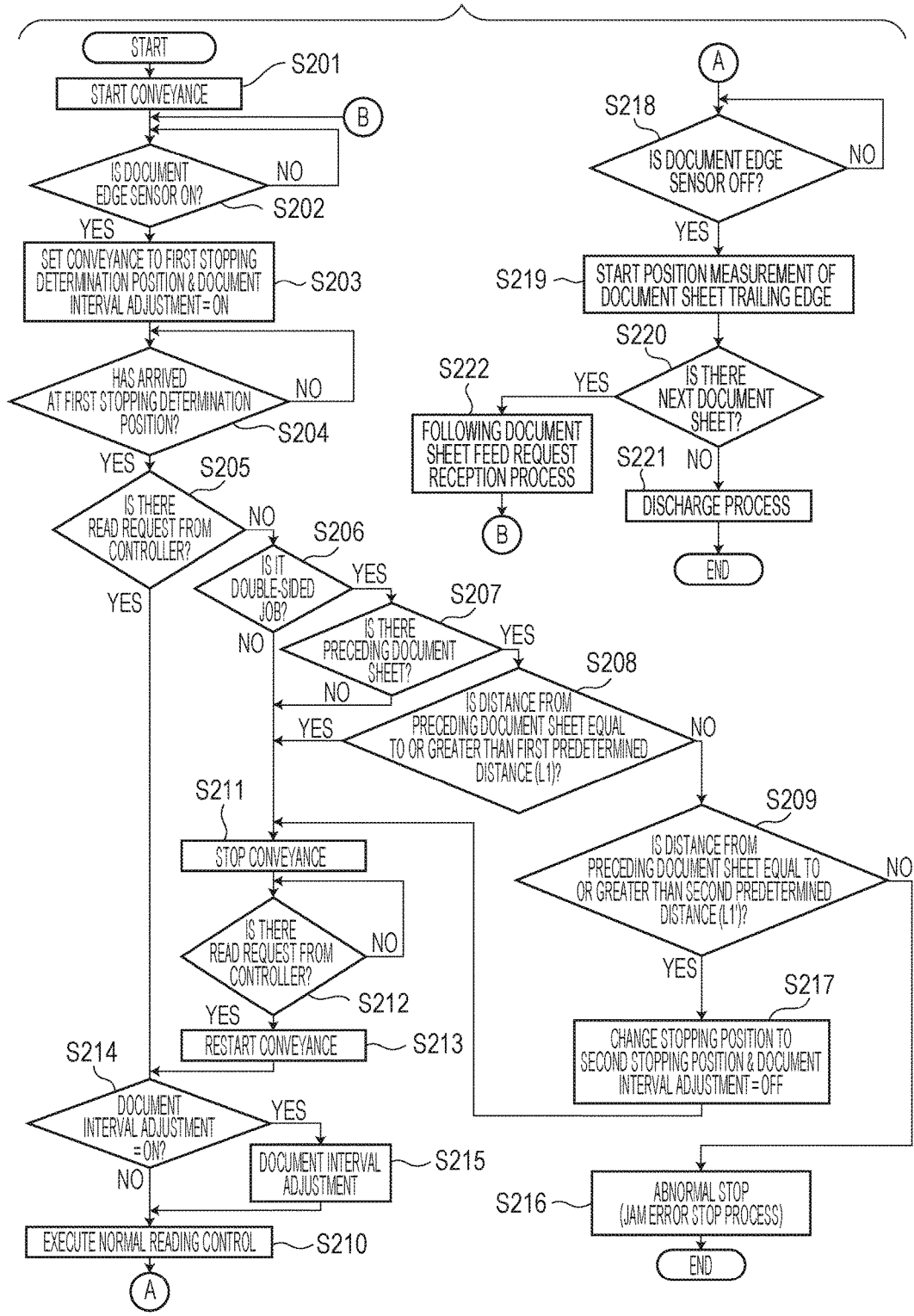
FIG. 14 is a control flowchart, according to one or more embodiment of the subject disclosure.
Figure 15:
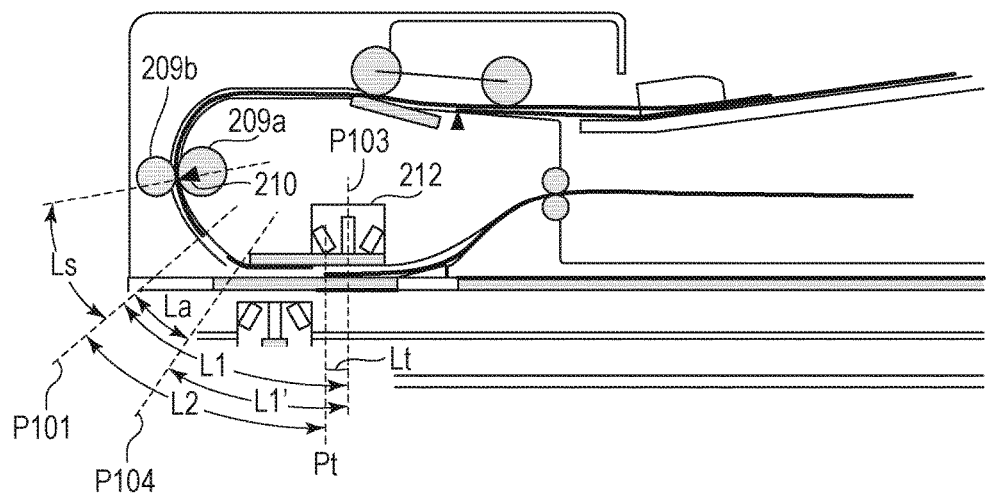
FIG. 15 is an explanatory view illustrating an abnormality determination process of a document conveyance, according to one or more embodiment of the subject disclosure.
Figure 16:
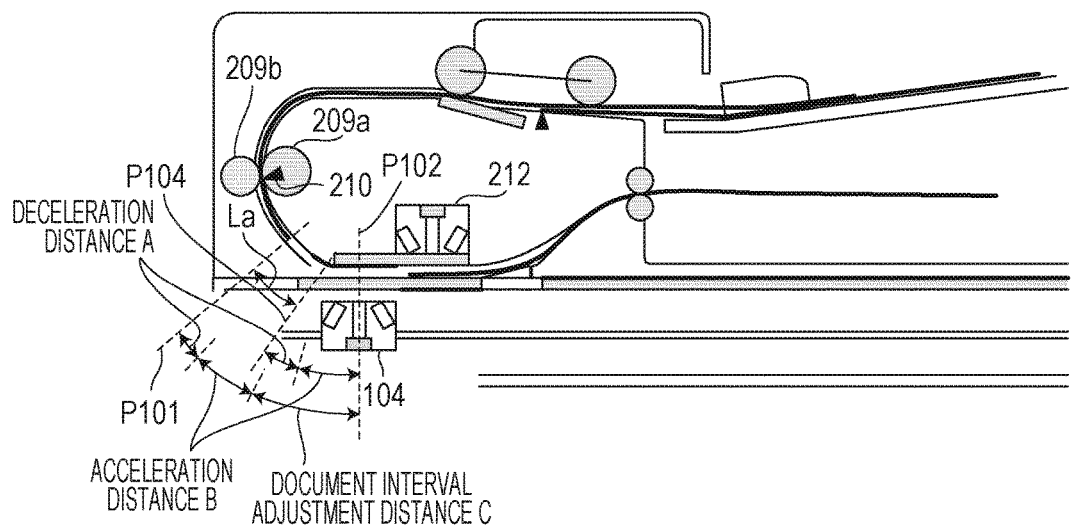
FIG. 16 is an explanatory view of a case where reading of a document sheet is temporarily stopped, according to one or more embodiment of the subject disclosure.

FIG. 14 is a flowchart describing a document conveyance control according to the second embodiment and is executed by the reader CPU 301 of the reader controller 300. FIG. 15 is a diagram illustrating a document conveyance state in an abnormality determination process according to the second embodiment. FIG. 16 is an explanatory view in a case where an original reading process is temporarily stopped.

<Description of Stopping Determination Position and Reading Position>

According to the second embodiment, as illustrated in FIG. 15, there are a first stopping determination position P101 and a second stopping determination position P104. The first stopping determination position P101 is placed at a same position as that in the first embodiment. The second stopping determination position P104 is set downstream of the first stopping determination position P101. A first predetermined distance L1 is a distance between the first stopping determination position P101 and the back-side reading position P103 as in the first embodiment. A second predetermined distance L1' is a distance between the second stopping determination position P104 and the back-side reading position P103. The distance between L1 and L1' is defined as La.

Further, as illustrated in FIG. 16, the second stopping determination position P104 is a position where an acceleration of the document sheet is completed before arriving at the front-side reading position P102 even when the document conveyance is restarted after a stopping control. When a distance needed to reduce speed to temporarily stop the drive of the convey motor 306 is set as a conveyance distance A and a distance needed to accelerate to restart the conveyance is set as an acceleration distance B, the second stopping determination position P104 is placed upstream of the front-side reading position with a distance A+B. This is a minimum document interval distance in a case where a stopping control is performed. Further, the first stopping determination position P101 is placed upstream of the second stopping determination position P104 with a document interval adjustment distance C. The document interval adjustment distance C is a distance needed to complete the adjustment of reading characteristics of the front-side reading unit 104 before the document sheet arrives at the front-side reading position P102 from the second stopping determination position P104. Thus, the distance between the first stopping determination position P101 and the front-side reading position P102 is A+B+C. In this case, the distance C needed to execute the document interval adjustment is equal to the distance La including the first stopping determination position P101 and second stopping determination position P104.

According to the present embodiment, before front-side reading unit 104 starts to read, a predetermined adjustment of the front-side reading unit 104 is performed. The distance C is a distance to maintain a period of time needed to perform a predetermined adjustment (document interval adjustment) of the front-side reading unit 104 in a case where a stopping control is not performed, after the reading of the front side of the preceding document sheet ends and before reading of the front side of the target document sheet starts.

The document interval adjustment includes a white level correction (luminance-intensity-distribution-variation correction) in a main scanning direction of line sensor as a reading element, a streak correction caused dust during image reading, and the like. The luminance-intensity-distribution-variation correction is a process to collect a light amount reduction of an LED array included in the front-side reading unit 104. More specifically, the light amount of an LED array is adjusted so that a white level of an image of a front-side white reference member 208 read by the front-side reading unit 104 becomes equal to a white level at a timing when the job is started. Further, the streak correction is a process to delete a streak caused by reading dust or stain on the first glass 102 and compensate the area with peripheral pixels. These adjustment processes are also performed for the back-side reading unit 212.

<Description of Document Conveyance Control According to Second Embodiment>

A document conveyance control according to the second embodiment will be described with reference to the flowchart of FIG. 14.

FIG. 14, the steps S201 and S202 are same as the steps S101 and S102 in FIG. 4 according to the first embodiment. When the document edge sensor 210 is turned on in S202, the reader CPU 301 performs setting to convey the document sheet to the first stopping determination position and turns on the document interval adjustment flag in S203. The document interval adjustment flag is a flag, which is stored in the reader RAM 303 and indicates whether to perform a document interval adjustment.

After that, the reader CPU 301 determines whether the document sheet arrives at the first stopping determination position based on motor pulse counting (S204), and determines whether a read request is sent from the system CPU 311 when the document sheet arrives at the first stopping determination position (S205).

If the reader CPU 301 has received a read request from the system CPU 311 in S205, the reader CPU 301 determines whether the document interval adjustment flag stored in the reader RAM 303 is ON (S214). Here, when the document interval adjustment flag is ON, the reader CPU 301 executes the above described document interval adjustment (S215). After that, the reader CPU 301 performs a normal reading operation in S210 and the details thereof are similar to that in S110 according to the first embodiment.

If the reader CPU 301 has not received a read request in S205, the process in S206 is executed and the processes in S206 to S208 and S211 to S213 are similar to the processes in S106 to S108 and S111 to S113 according to the first embodiment.

In S208, it is determined whether the distance L2 between the leading edge Ps of the target document sheet and the trailing edge of the preceding document sheet Pt is equal to or greater than the first predetermined distance L1. Here, as in the case of the first embodiment, the distance L1 is a distance between the leading edge Ps of the target document sheet and the back-side reading position P103. When the distance L2 is equal to or greater than the first predetermined distance L1, it is assumed that the trailing edge of the preceding document sheet has passed by the back-side reading position P103, and the reader CPU 301 performs a stopping control in S211. As illustrated in FIG. 15, when the distance L2 is smaller than the first predetermined distance L1, it is assumed that the trailing edge of the preceding document sheet Pt has not passed by the back-side reading position P103. Accordingly, when the stopping control is performed, the image read from the side of the trailing edge of the preceding document sheet becomes a defective image (an image elongated in a sub scanning direction). Thus, in a case where the distance L2 is smaller than the distance L1, the reader CPU 301 proceeds the process in S209.

In S209, the reader CPU 301 calculates a second predetermined distance L1', which is a distance between the second stopping determination position P104 and the back-side reading position P103 and compares the second predetermined distance L1' with the distance L2. The distance L1' is a distance that the distance La between the first stopping determination position P101 and the second stopping determination position P104 is subtracted from the first predetermined distance L1.

When the distance L1' is equal to or smaller than the distance L2, the trailing edge of the preceding document sheet Pt passes through the back-side reading position P103 by conveying the target document sheet to the second stopping determination position P104. Thus, even when the stopping control is executed at the second stopping determination position, the image read from the preceding document sheet does not cause a defective image. Thus, in a case where L1' is equal to or smaller than L2, the reader CPU 301 changes the position to perform the stopping control from the first stopping determination position P101 to the second stopping determination position P104 and turns off the document interval adjustment flag in S217. In other words, the target document sheet is conveyed to the second stopping determination position P104 and the stopping control is performed in S211.

Further, in a case where L1' is larger than L2, the reader CPU 301 executes a jam error stop process in S216. Here, the process in S216 is similar to the process in S109 according to the first embodiment.

Further, the following processes in S218 to S222 including the normal reading control in S210 are similar to the processes in S110 and S114 to S118 according to the first embodiment.

Here, according to the second embodiment, in a one-sided reading job, the distances L1 and L1' may be also set as distances from the first stopping determination position P101 and second stopping determination position P104 to the front-side reading position P102, respectively. With this configuration, an output of a defective image can be avoided even in a one-sided reading job.

As described above, according to the second embodiment, when a stopping control cannot be performed at the first stopping determination position P101, the stopping control is performed after conveying the document sheet to the second stopping determination position P104. With this configuration, an output of a defective image can be avoided even when the conveyance of a document sheet is temporarily stopped.

Third Embodiment

Next, a third embodiment of the present disclosure will be described. According to the third embodiment, an image forming device for printing an image read by a document reading device onto a recording sheet will be described. Here, in the third embodiment, the description of a configuration which is similar to those of the first and second embodiments will be made briefly or omitted.

Figure 17:
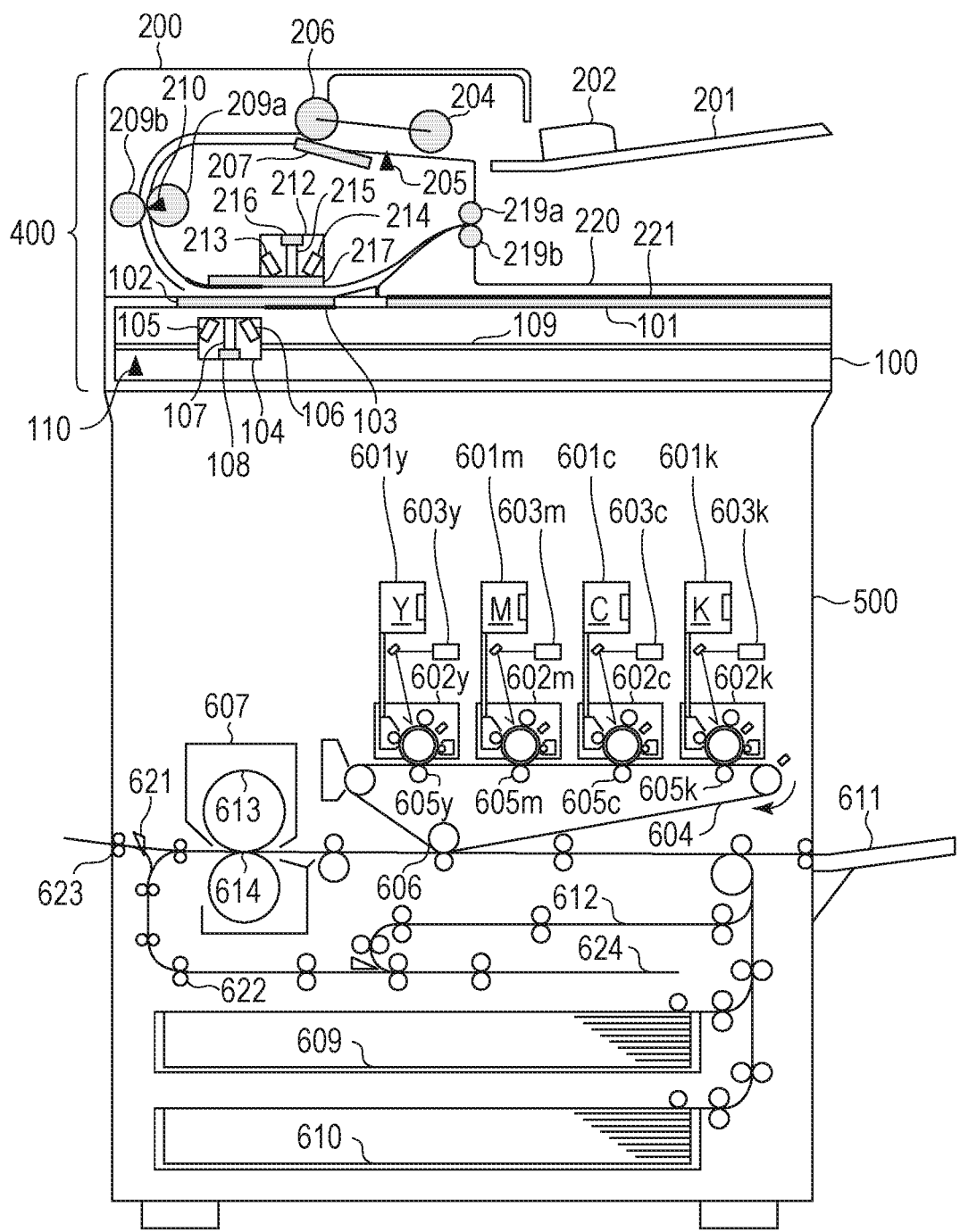
FIG. 17 is a sectional view of an image forming device, according to one or more embodiment of the subject disclosure.

FIG. 17 is a sectional view of an image forming device. The ADF 200 and image reading unit 100 included in the document reading device are equivalent to those in the first embodiment. In the following description, the ADF 200 and image reading unit 100 are collectively referred to as a reader section 400. The image forming device includes the reader section 400 and a printer section 500 for printing an image, which is read by the reader section 400, via the system controller 310.

Figure 18:
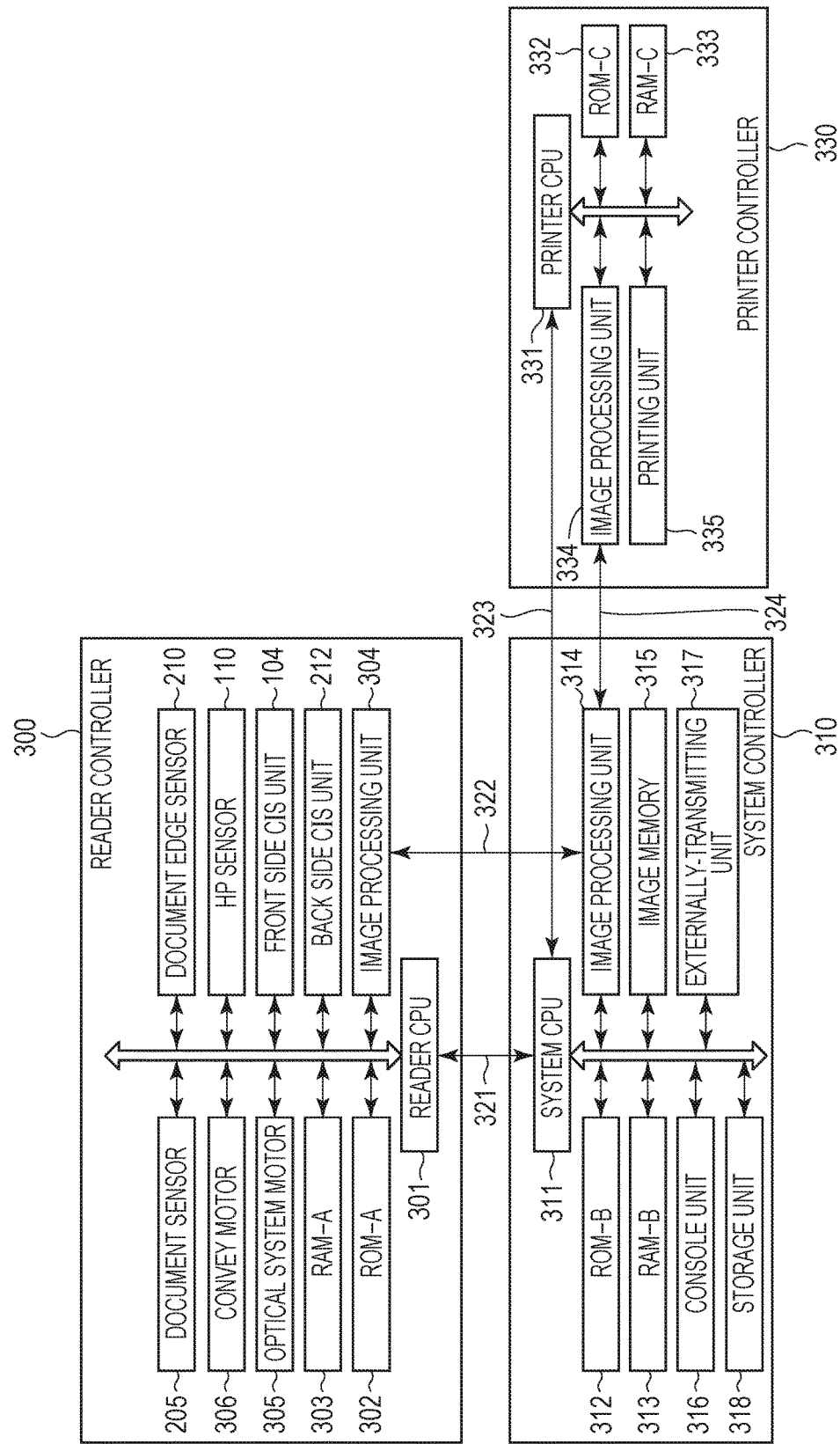
FIG. 18 is a control block diagram of the image forming device, according to one or more embodiment of the subject disclosure.

FIG. 18 is a block diagram illustrating a configuration example of a control unit of the image forming device. To the block diagram illustrated in FIG. 3 according to the first embodiment, a storage unit 318 and an externally-transmitting unit 317 are added in the system controller 310, and a printer controller 330 for performing a print control of the printer section 500 are also added.

The reader controller 300 is similar to that in the first embodiment. The system controller 310 is similar to that in the first embodiment, except for the storage unit 318 and externally-transmitting unit 317. The storage unit 318 includes a non-volatile memory such as a hard disk drive (HDD) and a flash ROM, and stores image data, which is processed in the system image processing unit 314 and stored in image memory 315. The externally-transmitting unit 317 transfers image data to an externa computer or a terminal via a network. The image data stored in the storage unit 318 is printed by the printer section 500 according to an instruction from a user or transferred to an external device from the externally-transmitting unit 317.

The printer controller 330 includes a printer CPU 331, a printer ROM 332, a printer RAM 333, a printer image processing unit 334, and a printing unit 335. The printer CPU 331 integrally controls the printing unit 335 and respective units. The printer ROM 332 is a storage device that stores, as a program, a control content executed by the printer CPU 331. The printer RAM 333 is a storage device serving as a work area which is used by the printer CPU 331 to perform controls. The printer CPU 331 transmits and receives data related to an image forming control to and from the system CPU 311 via the printer command data bus 323. The image data transmitted from the read image processing unit 304 via a data bus 322 and processed in the system image processing unit 314 or the image data stored in the storage unit 318 is transferred to the printer image processing unit 334 in the printer controller 330 via a data bus 324. The image data transferred to the printer image processing unit 334 is printed by the printing unit 335 after an image processing for printing is performed.

<Configuration Example of Printer Section 500>

An image forming operation by the printer section 500 will be described with reference to FIG. 17. Here the respective components of the printer section 500 illustrated in FIG. 17 are included in the printing unit 335.

Image data of a document sheet read by the front-side reading unit 104 or back-side reading unit 212 is transmitted to exposure control units 603 (y, m, c, k) after image processing is applied by the system controller 310. Laser beams output from the exposure control units 603 are radiated to photoconductive drums 605 (y, m, c, k) and electrostatic latent images are formed on the photoconductive drums 605. The electrostatic latent images on the photoconductive drums 605 are developed by developing units 602 (y, m, c, k), and toner images on the photoconductive drums 605, which becomes toner images, are transferred, by a secondary transfer unit 606, on a sheet fed by one of cassettes 609 and 610 and manual paper feeding unit 611. Toner of the toner images transferred on the sheet is fixed by a fixing unit 607. The fixing unit 607 includes a fixing roller 613 including a heater and a pressing roller 614 and the toner image is fixed on the sheet by applying heat and pressure with the fixing roller 613 and pressing roller 614. Temperatures of the fixing roller 613 and pressing roller 614 are set to a preferable temperature according to a sheet type.

In a one-side printing mode in which printing is performed only one side of the sheet, the sheet on which the toner image is fixed is conveyed by a flap 621 toward the conveying rollers 622 once and discharged outside of the device from a discharge unit 623 after making a switchback.

In a double-sided printing mode in which printing is performed on both sides of the sheet, the sheet on which a toner image is fixed on one side is conveyed by the flap 621 to the double-sided sheet reversing unit 624, and a switchback is made and conveyed to the double-sided sheet feeding path 612. On the other side of the sheet conveyed to the double-sided sheet feeding path 612, a toner image is transferred by the secondary transfer unit 606, the toner image is fixed by the fixing unit 607, and the sheet is discharged outside the device from the discharge unit 623.

Here, in the double-sided printing mode, the sheet on which printing is completed in one side thereof is always temporarily stopped in double-sided sheet feeding path 612. Thus, when the start of transferring image data on the other side by the system controller 310 is delayed, the sheet is kept in the double-sided sheet feeding path 612. Here, the sheet may also be kept in the double-sided sheet reversing unit 624.

Figure 21A:
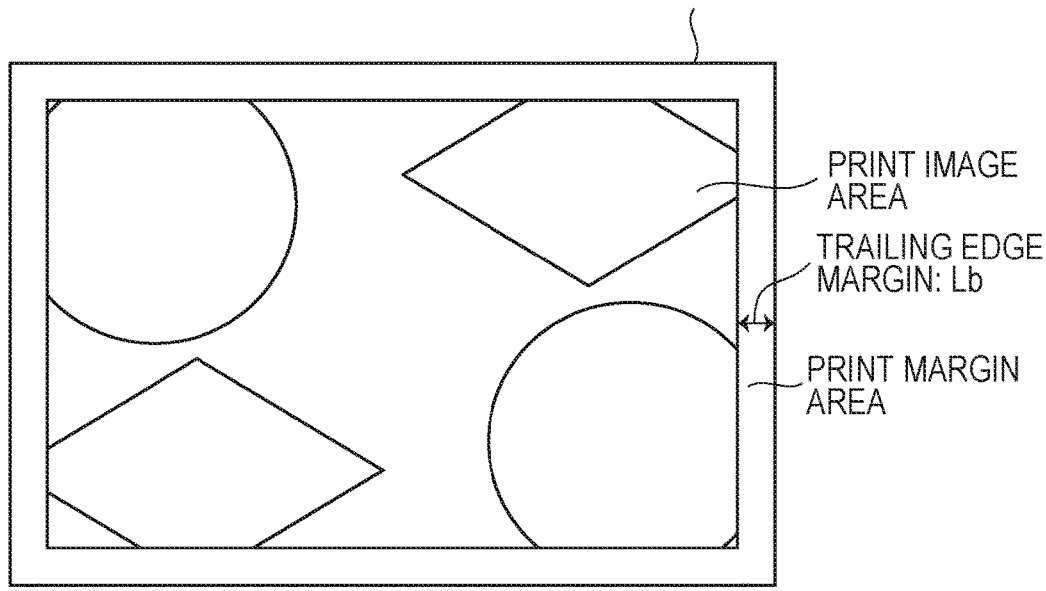
FIGS. 21A and 21B are diagrams illustrating a relationship of an original documents region and a print margin area, according to one or more embodiment of the subject disclosure.
Figure 21B:
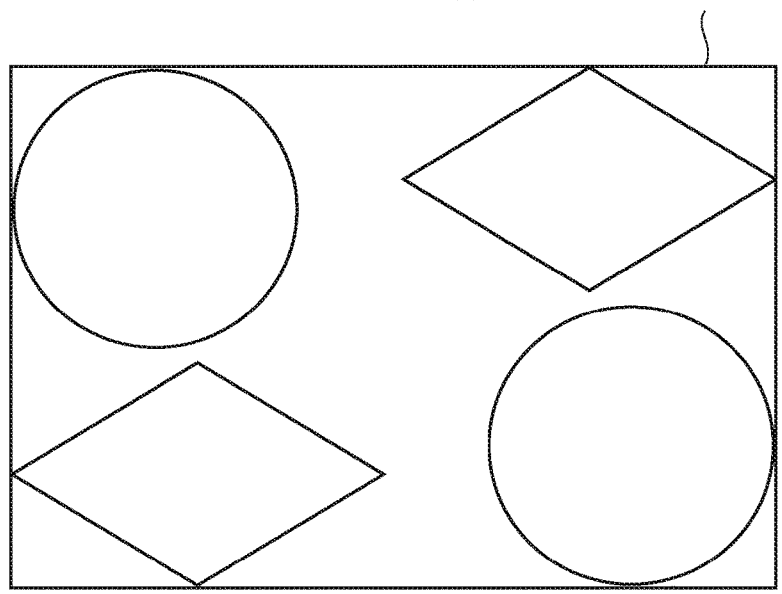

As illustrated in FIG. 21A, in a case where printing is performed on a sheet whose size is the same as the size of the original area, the print image is made slightly smaller than the sheet size and print margin areas are formed in four outer areas of the print image area. The image is not printed as overlapping the print margin area. In the print margin area, in FIG. 21A in which a leading edge margin, a left edge margin, a right edge margin, and a trailing edge margin, which are in a predetermined size, are provided, the size (the length) of the trailing edge margin is set as Lb. FIG. 21B illustrates an image of an original area, which is read. An image in which the four side margin areas are removed from the image of the original area, which is read is printed on a sheet.

In the image forming device according to the third embodiment, as a mode for using a reader section, two modes including a copy mode and a scan mode can be performed. The copy mode is a mode for printing an image, which is read by the reader section 400, in the printer section 500 via the system controller 310. The scan mode is a mode for storing the image read by the reader section 400 in the storage unit 318 of the system controller 310 or transmitting the image data outside the device such as a computer via the externally-transmitting unit 317.

In the copy mode, as illustrated in FIG. 21A, a print margin area is formed, and a part corresponding to the margin area around the scanned image data is not used. On the other hand, on the scan mode, as illustrated in FIG. 21B, the entire area of the scanned image data is used.

<Description of Document Conveyance Control ACCORDING to Third embodiment>

Figure 19:
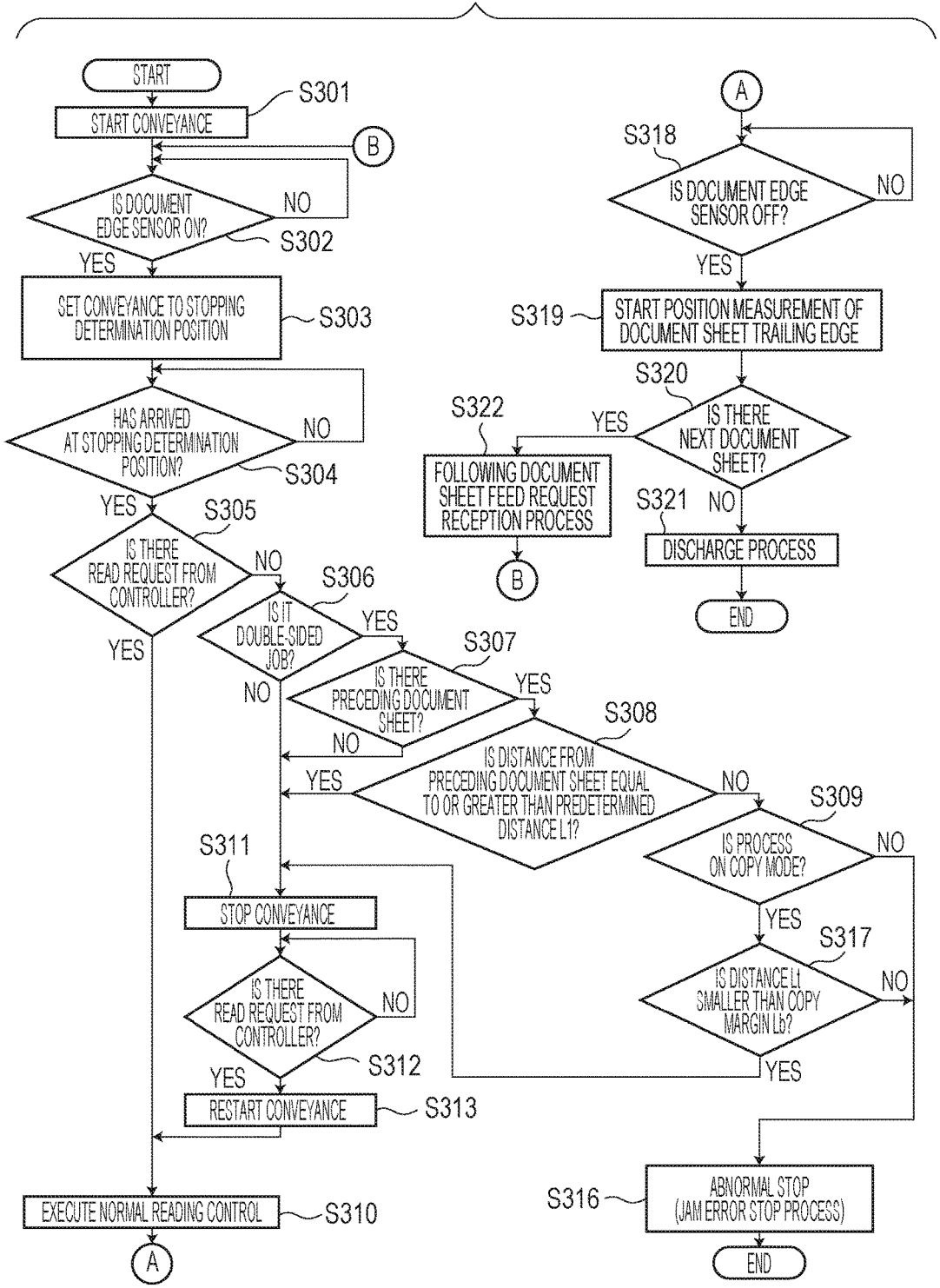
FIG. 19 is a control flowchart, according to one or more embodiment of the subject disclosure.

FIG. 19 is a flowchart for explaining a document conveyance control according to the third embodiment and the processes are executed by the reader CPU 301 of the reader controller 300. Description of the parts which are common with those in the flowchart of FIG. 4 of the first embodiment will be given briefly or omitted.

The processes in S301 to S308, S310 to S313, S316, and S318 to S322 in FIG. 19 are similar to the processes in S101 to S108, S110 to S113, S109, and S114 to S118 according to the first embodiment.

Figure 20:
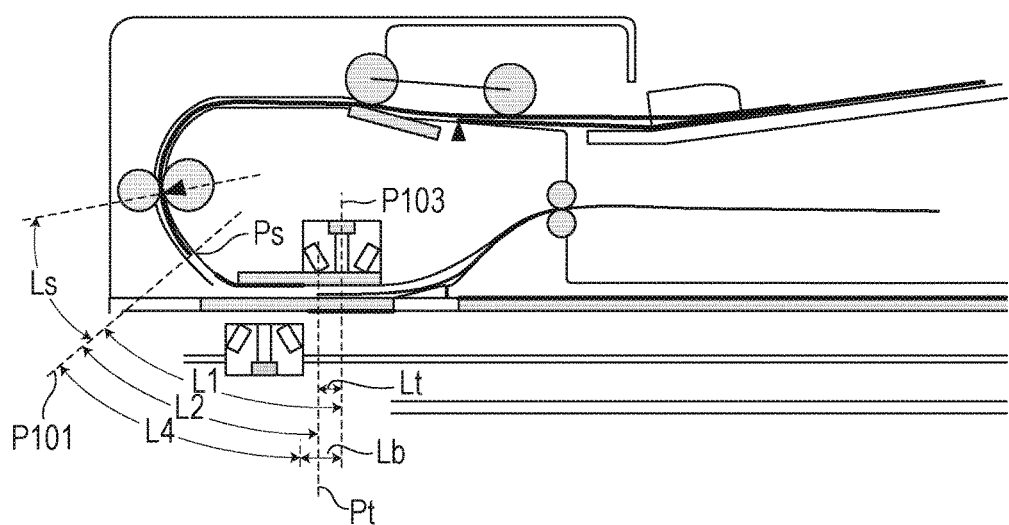
FIG. 20 is an explanatory view of an abnormality determination process of the document conveyance, according to one or more embodiment of the subject disclosure.

As in the first embodiment, in S308, when the distance L2 between the leading edge Ps of the target document sheet and the trailing edge of the preceding document sheet Pt is smaller than the distance L1, it is assumed that the trailing edge of the preceding document sheet has not passed by the back-side reading position P103. In other words, the image at the trailing edge of the preceding document sheet becomes a defective image which is elongated in a sub scanning direction. In this case, in S309, the reader CPU 301 determines whether process mode information stored in the reader RAM 303 is on a copy mode. In the case of the copy mode, since the area overlapping in the margin area in the original area is not printed, little impact is made even when the original image included in the area corresponding to the trailing edge margin is elongated in a sub scanning direction. Thus, as illustrated in FIG. 20, the reader CPU 301 compares the distance L2 between the leading edge Ps of the target document sheet and the trailing edge of the preceding document sheet Pt and the distance L4 that the trailing edge margin distance Lb is subtracted from the distance L1 between the leading edge Ps of the target document sheet and the back-side reading position P103 (S317). In the actual calculation, a distance Lt which is a difference between the trailing edge of the preceding document sheet position Pt and back-side reading position P103 is obtained and compared with the trailing edge margin distance Lb. In a case where Lt is equal to or smaller than Lb, even when the image, which is read, in the part of the trailing edge of the preceding document sheet becomes a defective image, the part is an area which is not printed in the printing by the printer section 500. Therefore, the reader CPU 301 determines that the image, which is read, is not abnormal, and proceeds the process to S311 based on the assumption that it is a normal condition. Here, the image data in the part corresponding to the distance Lt in the part of the trailing edge of the preceding document sheet may be replaced with white data.

Further, when it is determined that Lt is smaller than Lb in S317, a defective image in the part of the trailing edge of the preceding document sheet is printed by the printer section 500 and, thus, the reader CPU 301 considers the condition as a jam and stops the reading operation (S316). When the condition is considered as a jam and the reading operation is stopped, as in the first embodiment, the image data, which is already read, of the preceding document sheet is considered as invalid and discarded.

When it is determined that the process mode is not a copy mode in S309 (in a case of a scan mode), as in the first embodiment, the reader CPU 301 considers the condition is a jam and stops the reading operation (S316).

Here, in a printing process on a copy mode, the image may be printed as reading the document sheets one by one by the reader section 400, or the images may be printed after all the document sheets on the document tray 201 are read by the reader section 400.

Further, also in the third embodiment, the predetermined distance L1 is set as a distance from the stopping determination position P101 to the front-side reading position P102 during a one-sided reading job, when the reading control is temporarily stopped, an output of the defective image can be avoided even during a one-sided reading job.

According to the third embodiment, when a stopping control is needed during the reading control, according to the process mode (copy mode, scan mode), a defective image can be prevented from being printed by setting the document intervals which is determined as the read image is abnormal.

Further, the image forming device may include the document reading device according to the first and second embodiment connected to the printer section 500 according to the third embodiment.

According to the present disclosure, it is prevented that an image read when document conveying is temporarily stopped is output as a detect image, even with a configuration in which a plurality of conveying rollers is driven by a single motor.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent. Application No. 2017-026155, filed Feb. 15, 2017, which is hereby incorporated by reference herein in its entirety.

What is claimed is:

1. A document reading device comprising:
a conveyer configured to convey a document sheet using a single drive source;
a reader configured to read an image of the document sheet which is being conveyed through a reading position by the conveyer; and
a controller configured to stop conveyance by the conveyer when a read request for a first document sheet, which is being conveyed upstream of the reading position in a document sheet conveyance direction, has not been received,
wherein the controller invalidates the image read from a second document sheet which is being conveyed downstream of the first document sheet in a case where a trailing edge of the second document sheet has not passed through the reading position at a timing when the conveyance by the conveyer is stopped because of the read request having not been received, and validates the image read from the second document sheet in a case where the trailing edge of the second document sheet has passed through the reading position.

2. The document reading device according to claim 1, wherein the controller restarts the conveyance of the first document sheet which is being stopped when the read request is received, in a case where the trailing edge of the second document sheet has passed through the reading position at a timing when the conveyance by the conveyer is stopped.

3. The document reading device according to claim 1, wherein the controller determines that the document sheet is jammed in a case where the trailing edge of the second document sheet has not passed through the reading position at a timing when the conveyance by the conveyer is stopped.

4. The document reading device according to claim 1, wherein the controller conveys the first document sheet to the reading position, without stopping the conveyance by the conveyer, if the read request for the first document sheet, which is being conveyed upstream of the reading position, has been received.

5. The document reading device according to claim 1, wherein the reader includes a first reading unit that reads an image on one side of the document sheet at a first reading position and a second reading unit that reads an image on the other side of the document sheet at a second reading position located downstream of the first reading position, and
in a case where it is instructed to read images on both sides of the document sheet and the conveyance by the conveyer is stopped because of the read request having not been received, the controller invalidates the image read from the second document sheet when a trailing edge of the second document sheet, which is being conveyed downstream of the first document sheet, has not passed through the second reading position.

6. The document reading device according to claim 5 wherein in a case where it is instructed to read an image from one side of the document sheet and the conveyance by the conveyer is stopped because of the read request having not been received, the controller invalidates the image read from the second document sheet when the trailing edge of the second document sheet, which is being conveyed downstream of the first document sheet, has not passed through the first reading position.

7. The document reading device according to claim 1, wherein in a case where the read request for the first document sheet has not been received at a timing when the first document sheet arrives at a predetermined position upstream of the reading position, the controller stops the conveyance by the conveyer and invalidates the image read from the second document sheet when a distance between a leading edge of the first document sheet and the trailing edge of the second document sheet is smaller than a distance between the predetermined position and the reading position, and in a case where the read request for the first document sheet has not been received at a timing when the first document sheet arrives at the predetermined position upstream of the reading position, the controller validates the image read from the second document sheet when a distance between the leading edge of the first document sheet and the trailing edge of the second document sheet is larger than the distance between the predetermined position and the reading position.

8. A document reading device comprising:
a conveyer configured to convey a document sheet using a single drive source;
a reader configured to read an image of the document sheet which is being conveyed through a reading position by the conveyer; and
a controller configured to stop conveyance by the conveyer when a read request for a first document sheet, which is being conveyed upstream of the reading position in a document sheet conveyance direction, has not been received,
wherein in a case where a trailing edge of a second document sheet, which is being conveyed downstream of the first document sheet, has passed through the reading position at a timing when the conveyance by the conveyer is stopped because of the read request having not been received, the controller validates the image read by the reader from the second document sheet and stops the first document sheet at a first stop position located upstream of the reading position, and
wherein in a case where the trailing edge of the second document sheet has not passed through the reading position when the conveyance by the conveyer is stopped because of the read request having not been received and the trailing edge of the second document sheet would pass through the reading position if the first document sheet is conveyed to a second stop position located between the first stop position and the reading position, the controller validates the image read by the reader from the second document sheet and stops the first document sheet at the second stop position.

9. The document reading device according to claim 8, further comprising
an image processor configured to execute an adjustment process of the reader before the leading edge of the first document sheet arrives at the reading position and after the trailing edge of t second document sheet passes through the reading position,
wherein the controller controls the image processor not to execute the adjustment process when the first document sheet is made stopped at the second stop position.

10. A document reading device that can execute a copy mode which an image of a document sheet is read to print the read image on a sheet and a margin area which is not printed in the read image is formed and a scan mode which an image of a document sheet is read to transmit the read image to an external device, the document reading device comprising:
a conveyer configured to convey the document sheet using a single drive source;
a reader configured to read the image of the document sheet which is being conveyed through a reading position by the conveyer; and
a controller configured to stop conveyance by the conveyer when a read request for a first document sheet, which is being conveyed upstream of the reading position in a document sheet conveyance direction, has not been received,
wherein while the document reading device is operating on the scan mode, the controller invalidates the image of a second document sheet, which is being conveyed downstream of the first document sheet, read by the reader in a case where a trailing edge of the second document sheet has not passed through the reading position at a timing when the conveyance by the conveyer is stopped because of the read request having not been received, and the controller validates the image of the second document sheet read by the reader in a case where the trailing edge of the second document sheet has passed through the reading position when the conveyance by the conveyer is stopped because of the read request having not been received, and
wherein while the document reading device is operating on the copy mode, the controller invalidates the image of the second document sheet read by the reader in a case where the trailing edge of the second document sheet, which is being conveyed downstream of the first document sheet, has not passed through a predetermined position located upstream of the reading position by a predetermined distance at the timing when the conveyance by the conveyer is stopped because of the read request having not received, and the controller validates the image of the second document sheet read by the reader in a case where the trailing edge of the second document sheet has passed through the predetermined position when the conveyance by the conveyer is stopped because of the read request having not received, the predetermined distance being a distance corresponding to the margin area at the trailing edge of the second document sheet.

11. The document reading device according to claim 10, wherein while the document reading device is operating on the copy mode, in a case where the trailing edge of the second document sheet, which is being conveyed downstream of the first document sheet, has not passed through the predetermined position, the controller replaces the image in an area corresponding to the margin area in the image read from the second document sheet with white data.

12. An image forming device comprising:
a conveyer configured to convey a document sheet using a single drive source;
a reader configured to read an image of the document sheet which is being conveyed through the reading position by the conveyer;
a printer configured to print the image of the document sheet read by the reader onto a recording sheet; and a controller configured to stop conveyance by the
conveyer in a case where a read request for a first document sheet, which is being conveyed upstream of the reading position in a document sheet conveyance direction, has not been received;
wherein the controller invalidates the image read from a second document sheet in a case where the trailing edge of the second document sheet, which is being conveyed downstream of the first document sheet, has not passed through the reading position at a timing when the conveyance by the conveyer is stopped because of the read request having not received, and validate the image read from the second document sheet in a case where the trailing edge of the second document sheet has passed through the reading position when the conveyance by the conveyer is stopped because of the read request having not received.

* * * * *